US007042712B2

(12) United States Patent
Ghosh et al.

(10) Patent No.: US 7,042,712 B2
(45) Date of Patent: May 9, 2006

(54) EXTENDED STAND COMPUTER SYSTEM WITH RETRACTABLE KEYBOARD

(75) Inventors: Prosenjit Ghosh, Portland, OR (US); Shreekant Suryakant Thakkar, Portland, OR (US); Nicholas Waddell Oakley, Portland, OR (US); Truong V. Phan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/663,169

(22) Filed: Sep. 15, 2003

(65) Prior Publication Data

US 2005/0057892 A1  Mar. 17, 2005

(51) Int. Cl.
*H05K 7/16* (2006.01)

(52) U.S. Cl. ............... 361/680; 206/320; 345/169; 400/489

(58) Field of Classification Search ........ 361/724–727, 361/679–687; 312/223.1–223.6; 206/305, 206/320; 364/708.1; 345/168, 169; 400/489, 400/691–693
See application file for complete search history.

(56) References Cited

U.S. PATENT DOCUMENTS

| 5,383,138 A | * | 1/1995 | Motoyama et al. ......... 361/683 |
| 5,646,820 A | * | 7/1997 | Honda et al. ............... 361/683 |
| 5,687,058 A | * | 11/1997 | Roylance .................... 361/680 |
| 5,894,406 A | * | 4/1999 | Blend et al. ................ 361/680 |
| 6,597,568 B1 | * | 7/2003 | Ryder ......................... 361/683 |
| 2004/0240167 A1 | * | 12/2004 | Ledbetter et al. .......... 361/683 |

* cited by examiner

*Primary Examiner*—Hung Van Duong

(74) *Attorney, Agent, or Firm*—David N. Tra

(57) ABSTRACT

A computer system includes a panel that when unfolded may expose a keyboard and a stand. The stand is to support the computer system in its upright position. The keyboard may be a wireless keyboard and may be part of a keyboard tray. When the panel is unfolded, the keyboard may be slid into or out of the stand. When the keyboard is slid into the stand, the keyboard tray and the stand form the panel. When the panel is folded, a carrying handle may be used to carry the computer system from one place to another place.

20 Claims, 32 Drawing Sheets

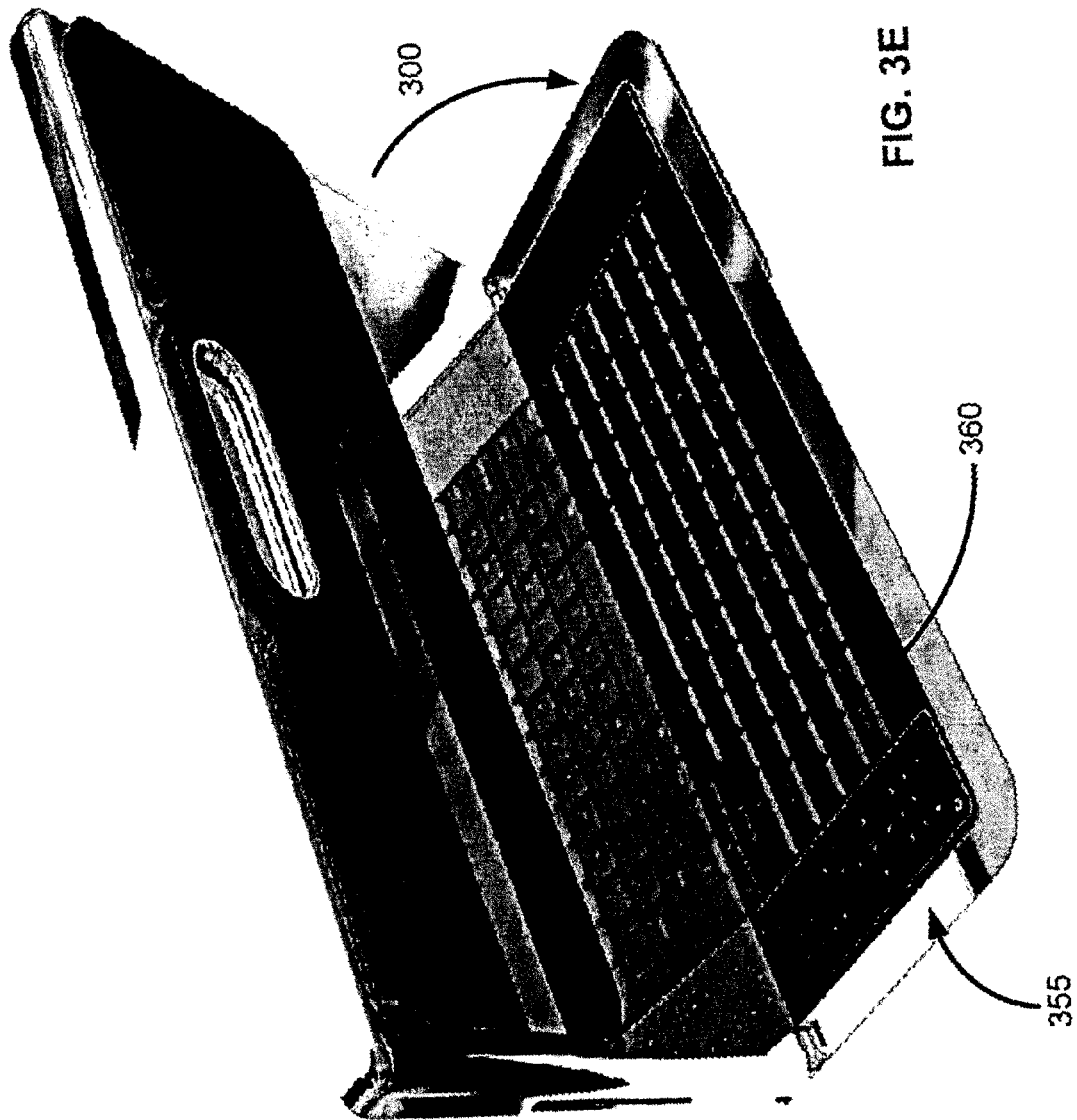

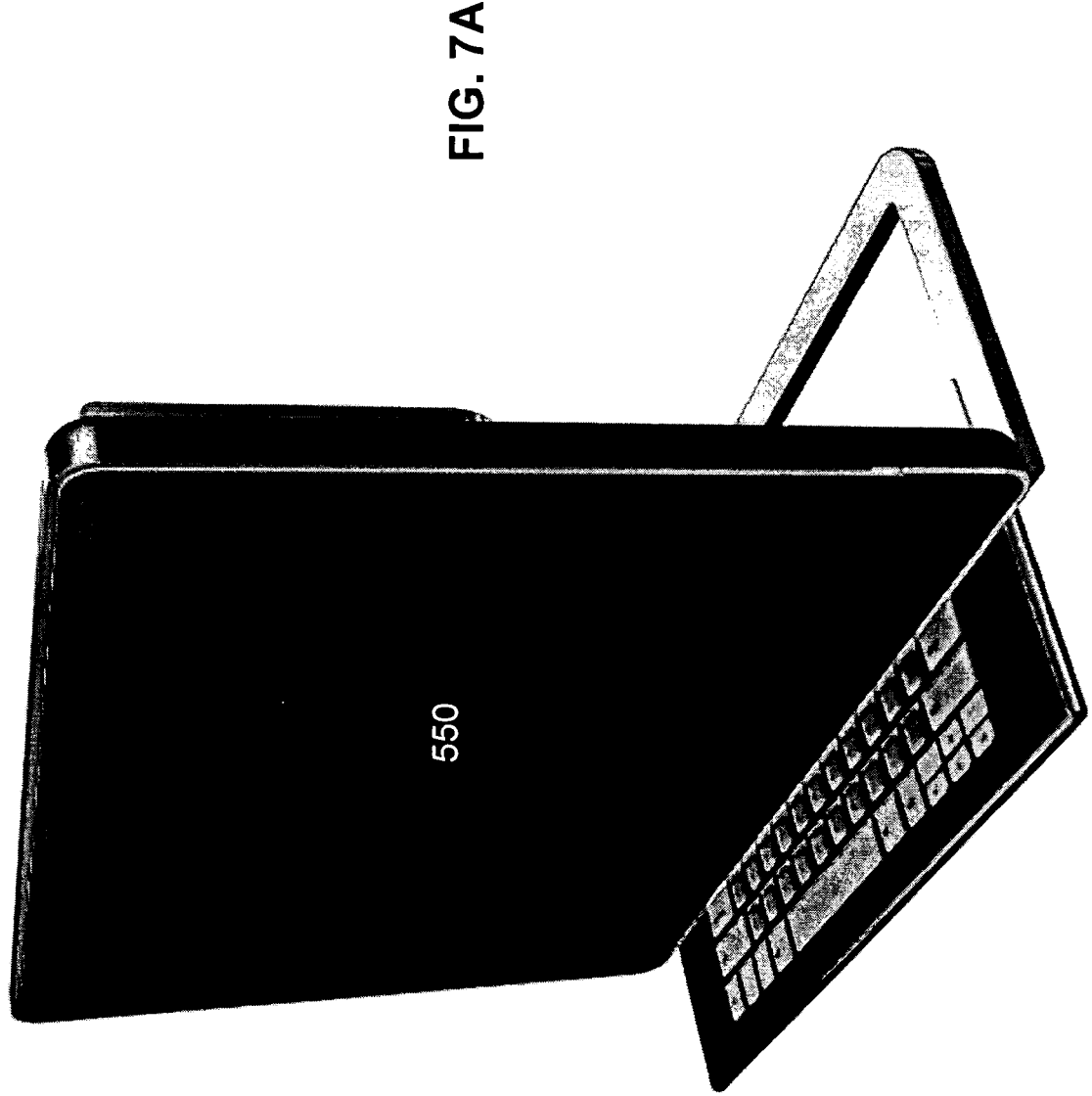

EXTENDED STAND COMPUTER SYSTEM WITH RETRACTABLE KEYBOARD

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of computer systems and more particularly related to computer systems that may be portable.

BACKGROUND

Desktop computers are normally heavy comparing to notebook (also called laptop or mobile) computers. A desktop computer typically includes a separate display unit or monitor connected to a system or base unit via a display cable. Notebook computers on the other hand are typically light and compact and are becoming more popular in recent years.

One advantage of notebook computers is their ease of mobility. The lighter weight and the compact size together with the long battery life have made the use of notebook computers more commonplace. The light weight and the dependency on battery life mean that the notebook computers may not be equipped with as many features as their larger desktop siblings.

BRIEF DESCRIPTION OF THE DRAWINGS

The invention is illustrated by way of example and not limitation in the figures of the accompanying drawings, in which like references indicate similar or identical elements, and in which:

FIGS. 3C to 3F illustrate examples of the computer system in its upright position at various angles, in accordance with one embodiment.

FIGS. 7A to 7B illustrates examples of the keyboard tray being partially retracted into the lower panel, in accordance with one embodiment.

DETAILED DESCRIPTION

For one embodiment, a computer system having a foldable stand and a retractable keyboard is disclosed. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Overview

Figure 1A:
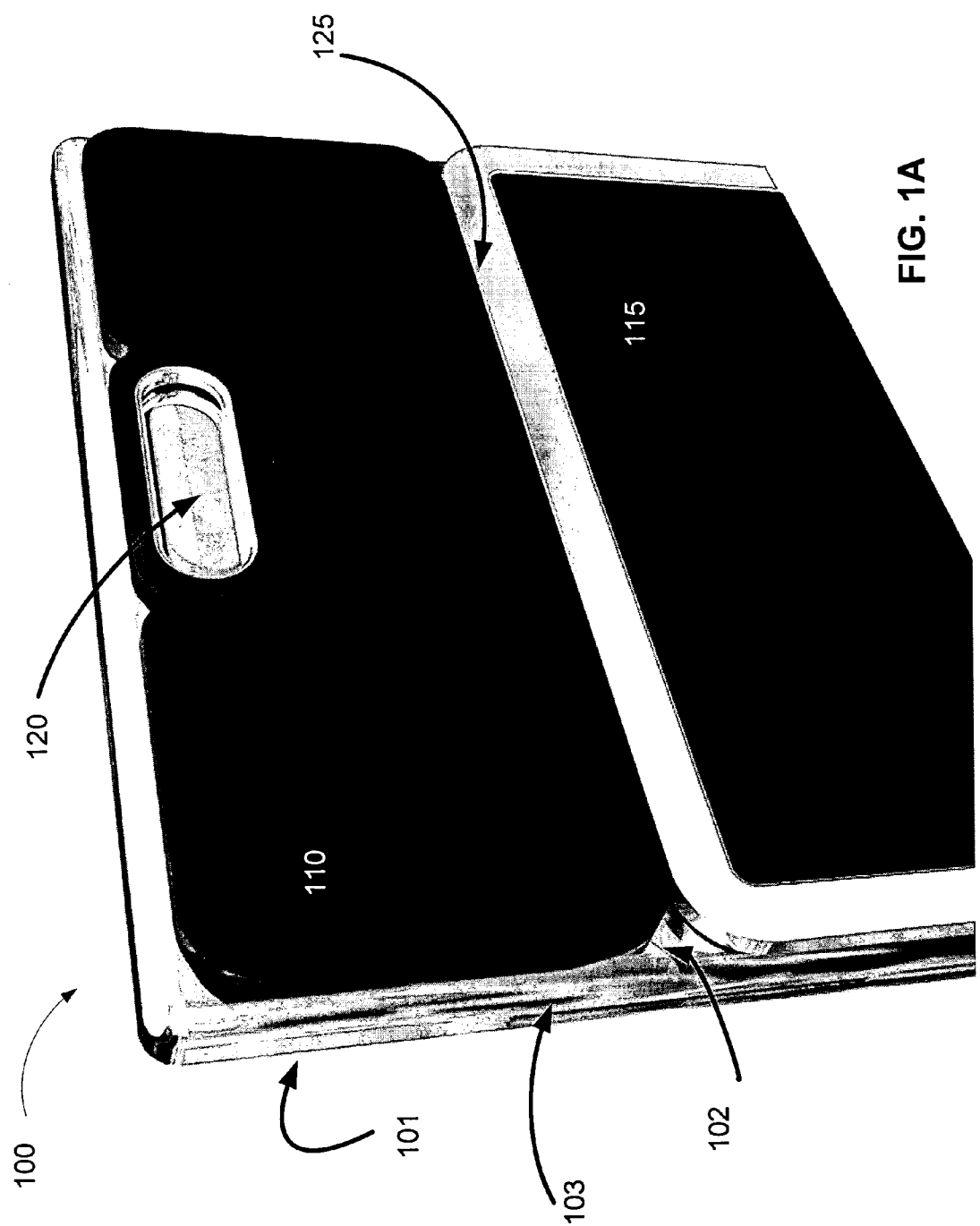
FIG. 1A illustrates a computer system, in accordance with one embodiment.

FIG. 1A illustrates a computer system, in accordance with one embodiment. Computer system 100 may include a housing 103 which may be rectangular and flat. The housing 103 may include many electronic components, circuit boards and the like. The housing 103 may include a front side 101 and a back side 102. The housing 103 may be in an upright position when the computer system 100 is in its normal operation mode. The housing 103 may lie flat on its back side 102 or its front side 101 when the computer system 100 is not in its normal operation mode. Although the computer system 100 may not look like a typical desktop computer, it is envisioned that the computer system 100 may include features and may deliver performance similar to a typical desktop computer. It is also envisioned that that the computer system 100 may occasionally be moved from place to place (i.e., portable) and that it may normally be connected to an alternating current (AC) power source and a wired network.

Back Side of the Housing

Figure 1C:
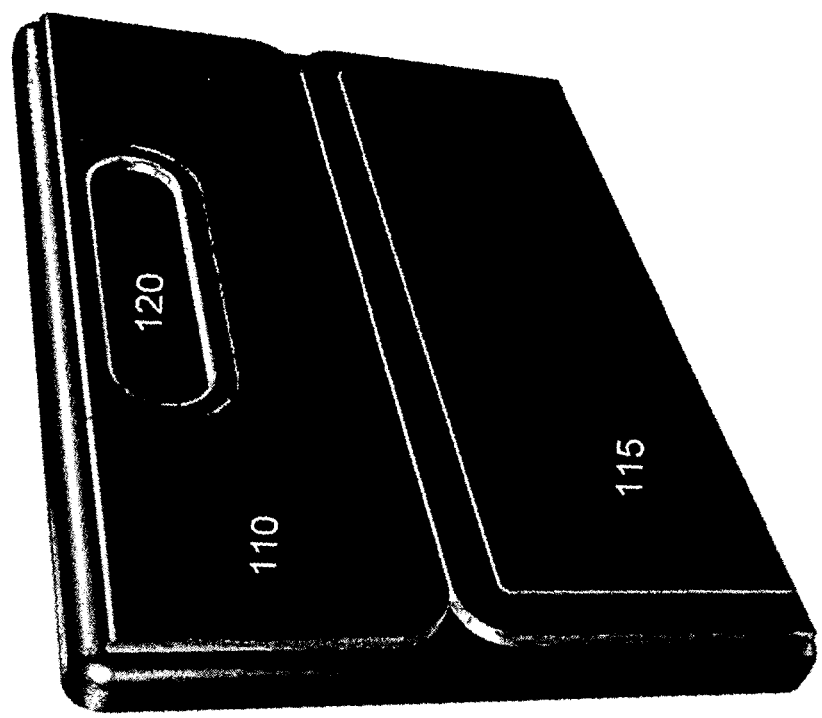
FIGS. 1B to 1C illustrate two different views of the back side of a computer system, in accordance with one embodiment.
Figure 1B:
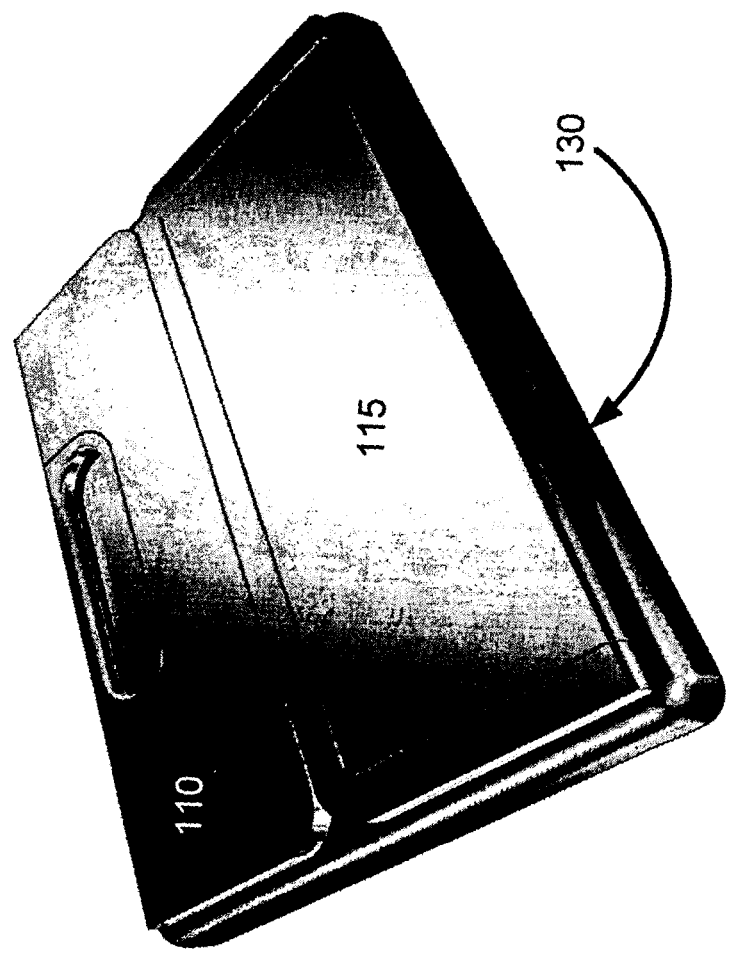

FIGS. 1B to 1C illustrate two different views of the back side 102 of the computer system 100, in accordance with one embodiment. The back side 102 may include an upper panel 115 (may be referred to as a first panel) and a lower panel 110 (may be referred to as a second panel). The upper panel 115 may include an indentation 120. For one embodiment, the indentation 120 may be oval and its depth may be the same as the thickness of the upper panel 115 such that the bottom of the indentation 120 may be a portion of the back side 102 of the computer system 100. The indentation may be part of a carrying handle (not shown).

For one embodiment, the upper panel 115 may be affixed, embedded or attached solidly or semi-solidly to the back side 102 of the computer system 100. Alternatively, the upper panel 115 may be part of the back side 102 of the computer system 100 or may be molded as part of the back side of the computer system 100. The lower panel 110 may border the upper panel 115 at separating edge 125. The separating edge 125 may be near the center of the back side 102 of the computer system 100. The separating edge 125 may be rounded at the corners for the upper panel 115 and at the corners for the lower panel 110. The upper panel 115 and the lower panel 110 may have similar thickness. In the examples illustrated in FIGS. 1A to C, the computer system 100 may not be in a normal operation mode.

Carrying Handle

Figure 2B:
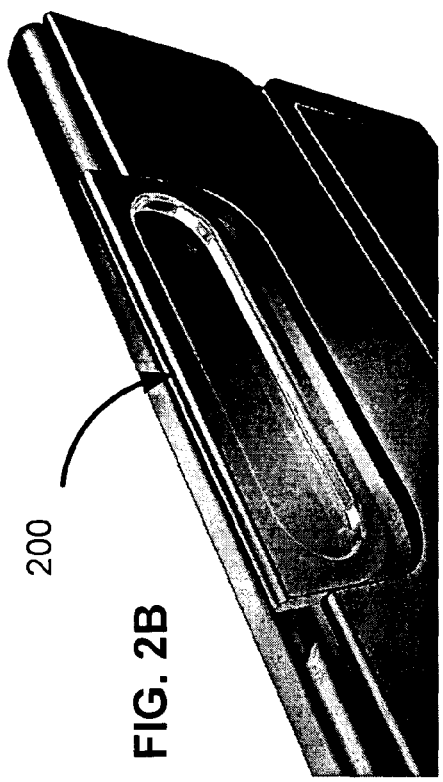
FIGS. 2A to 2D illustrate different positions of a carrying handle of a computer system, in accordance with one embodiment.
Figure 2D:
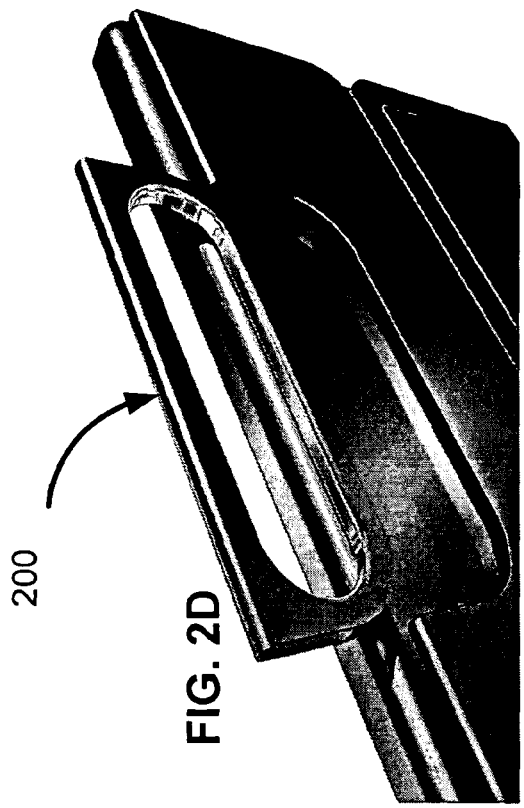
Figure 2A:
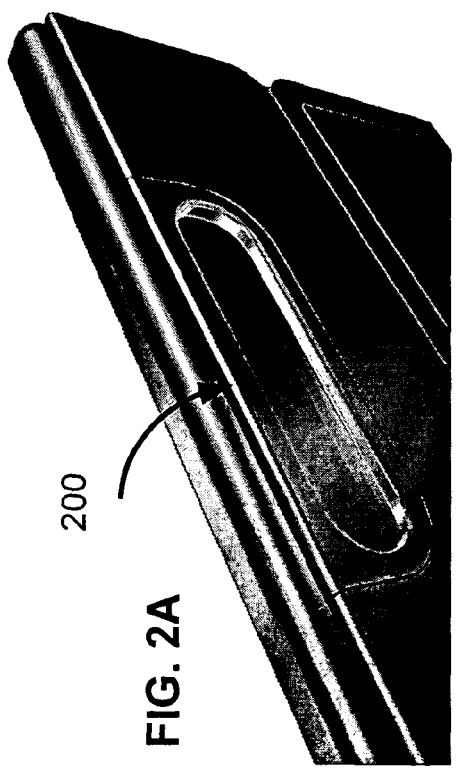
Figure 2C:
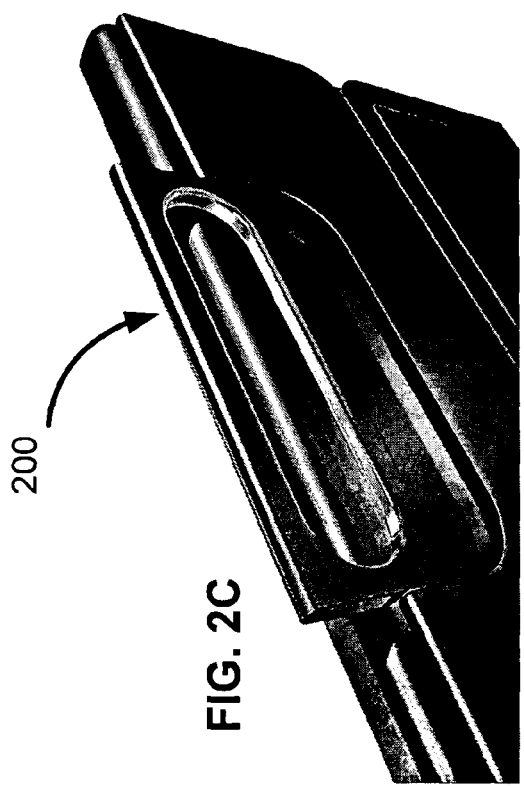
Figure 2E:
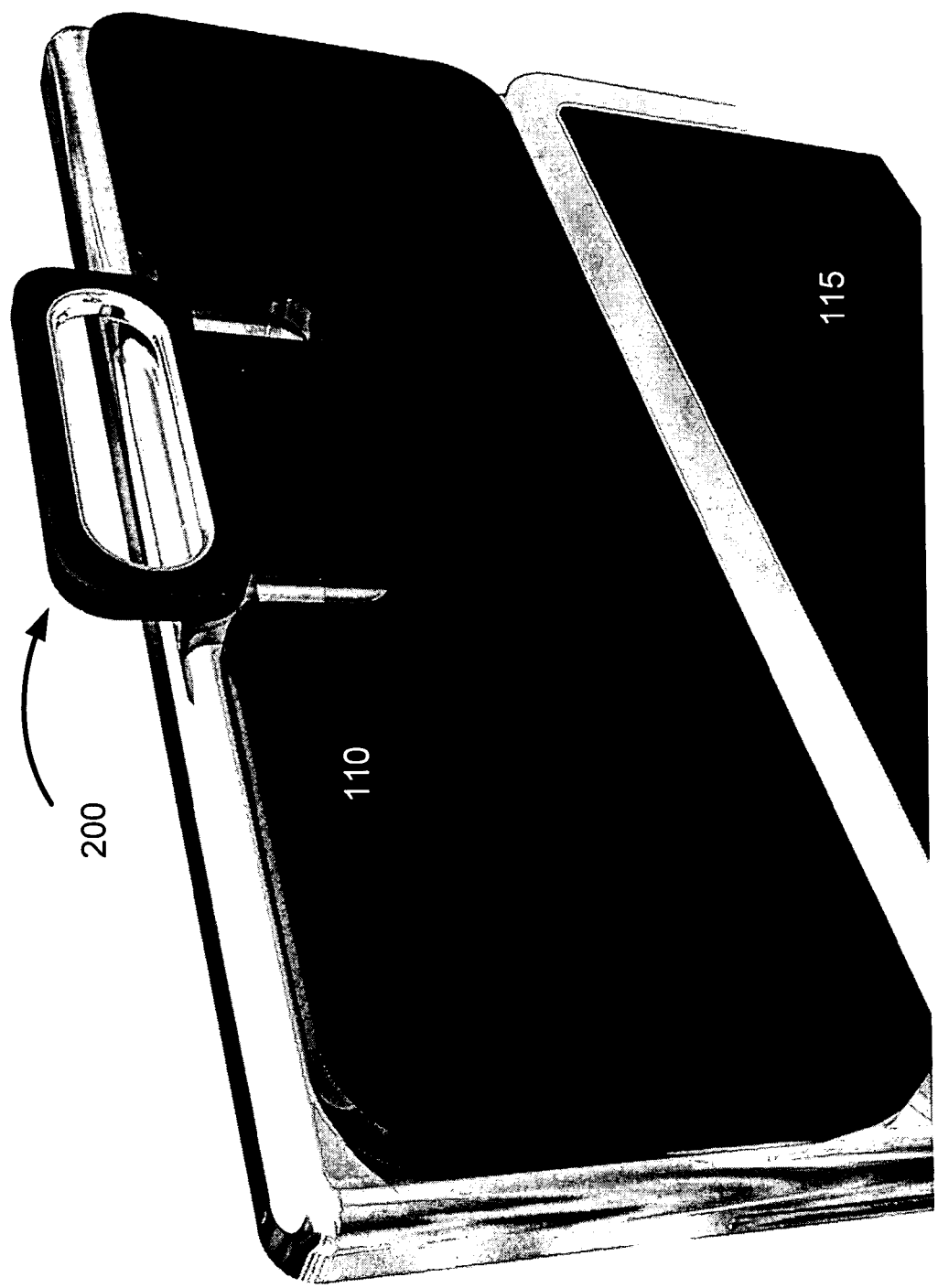
FIG. 2E illustrates a carrying handle of a computer system in its fully open position, in accordance with one embodiment.

FIGS. 2A to 2D illustrate examples of different positions of the carrying handle, in accordance with one embodiment. As described above, carrying handle 200 may be included in the upper panel 115. For one embodiment, the carrying handle 200 may be exposed by sliding from the upper panel 115 starting from a fully retracted position (as illustrated in FIG. 2A). The carrying handle 200 may be partially exposed (as illustrated in FIGS. 2B to 2C) or fully exposed (as illustrated in FIG. 2D). Note that the indentation 120 described in FIGS. 1A to 1C may now be more clearly seen as an opening to enable a user to grab on to the carrying handle 200 and move the computer system 100 from one place to another place. Although not shown, a guiding/locking mechanism may be used to enable the carrying handle 200 to move as it is adjusted against the upper panel 115. The guiding/locking mechanism may also be used to prevent the carrying handle 200 from being completely detached from the upper panel 115. It may be noted that the position of the carrying handle 200 may not affect the operation or performance of the computer system 100. FIG. 2E illustrates another example of the carrying handle 200 in its fully exposed position, in accordance with one embodiment. For one embodiment, the carrying handle may include an antenna coupled to one or more communication devices in the computer system 100. In this situation, the different positions of the carrying handle 200 may affect the performance of the antenna.

Keyboard Tray and Stand

Figure 3B:
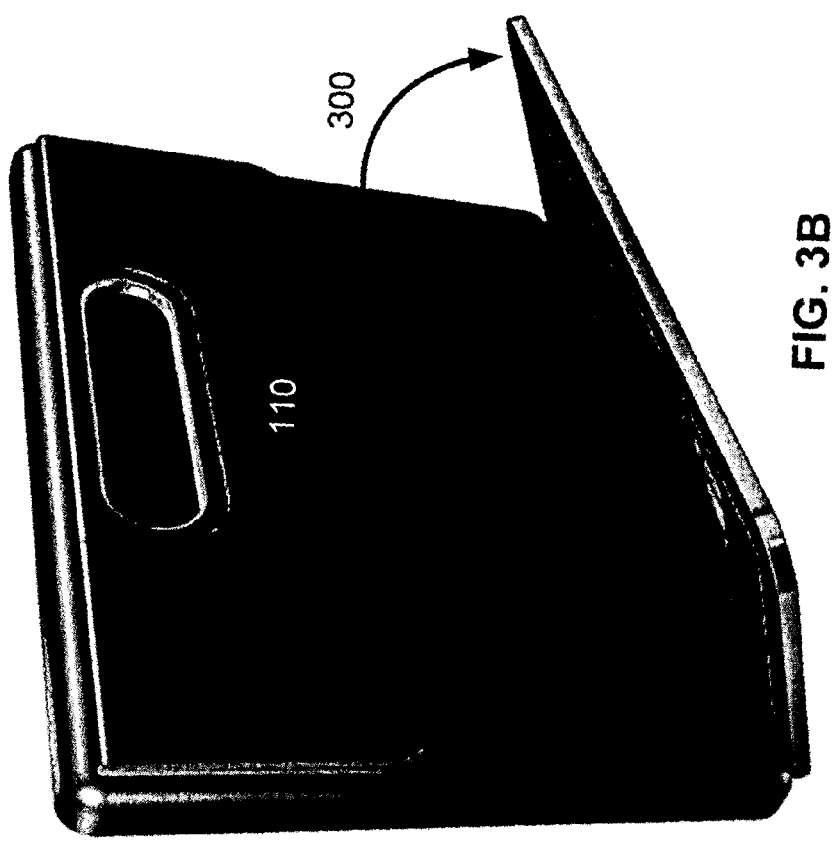
FIGS. 3A to 3B illustrate different positions of the lower panel of the computer system as the lower panel is being unfolded, in accordance with one embodiment.
Figure 3A:
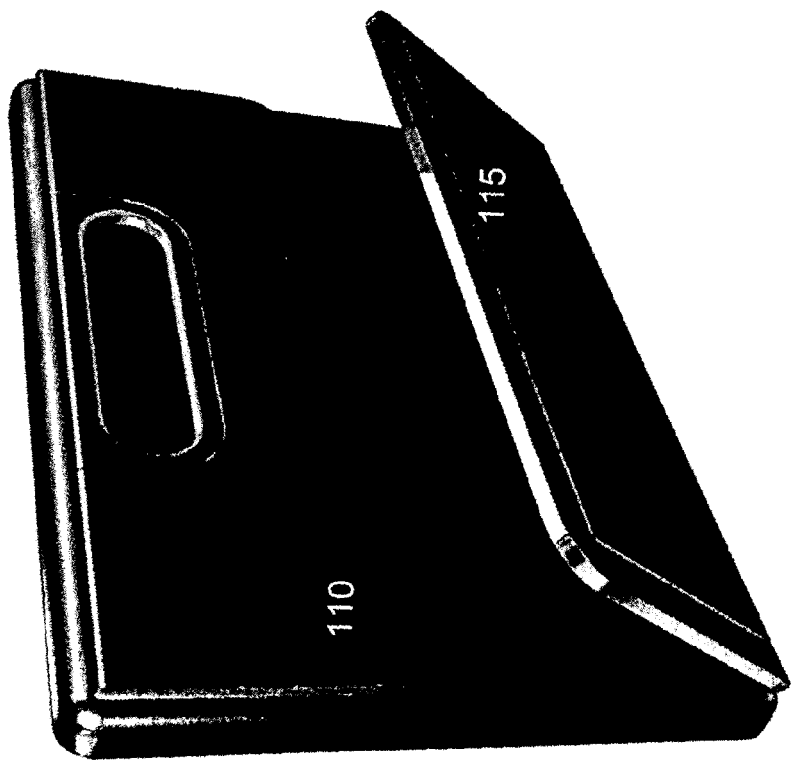
Figure 3C:
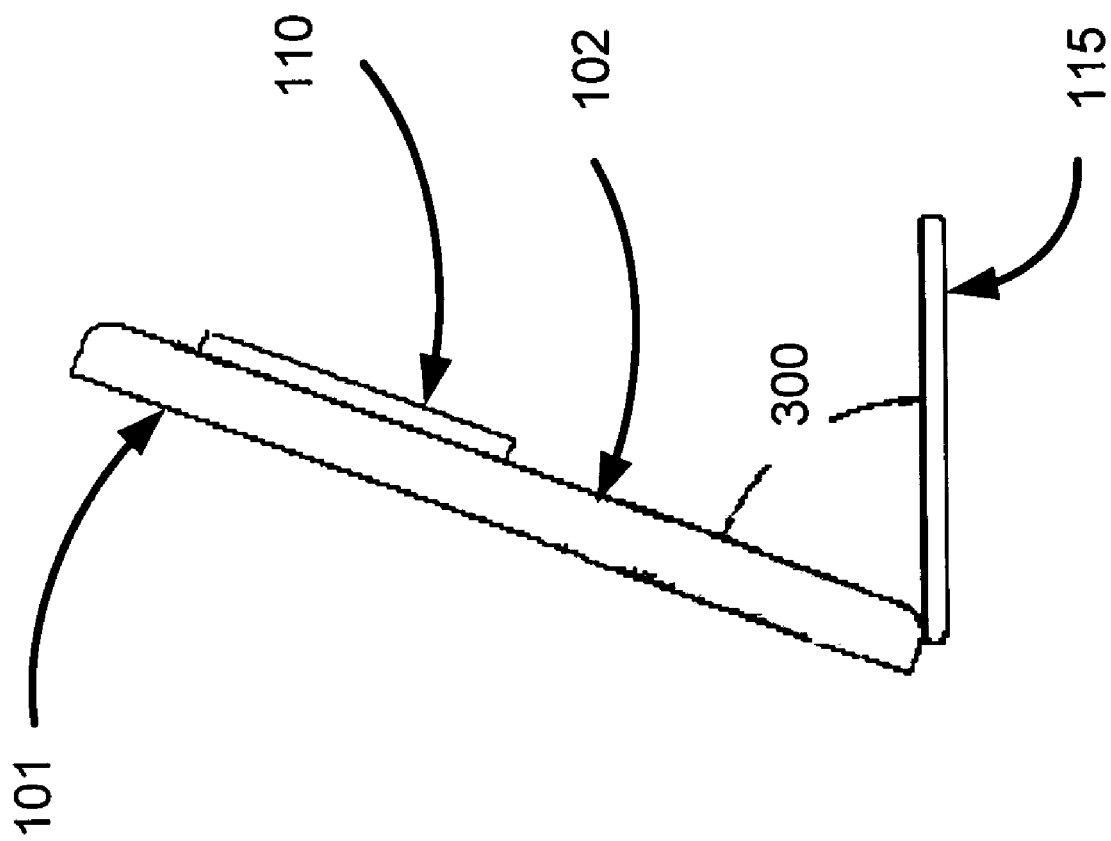

FIGS. 3A and 3B illustrate different positions of the lower panel 110 of the computer system as the lower panel 110 is unfolded, in accordance with one embodiment. The lower panel 110 may be attached to the computer system 100 at or near bottom edge 130 via one or more hinge mechanism (not shown) or any other types of attachment mechanism. The hinge mechanism may include an engage or locking mechanism (not shown) suitable to enable the lower panel 110 to engage or lock at one or more positions when it is unfolded from the back side 102. The locking mechanism may also help limit the angle 300. This may control how far the lower panel 110 may be unfolded from the back side 102 of the computer system 100. For one embodiment, the angle 300 may be equal to or less 90 than degrees when the housing 103 is in its normal upright position. This may help preventing the possibility that the housing 103 may tip over on its front side 101. FIG. 3C illustrates one example of a side view of the computer system 100, in accordance with one embodiment. Note that, in this example, the angle 300 is set at 70 degrees. When the stand is unfolded as in the example illustrated in FIG. 3C, it is considered to be in an extended position.

Figure 3D:
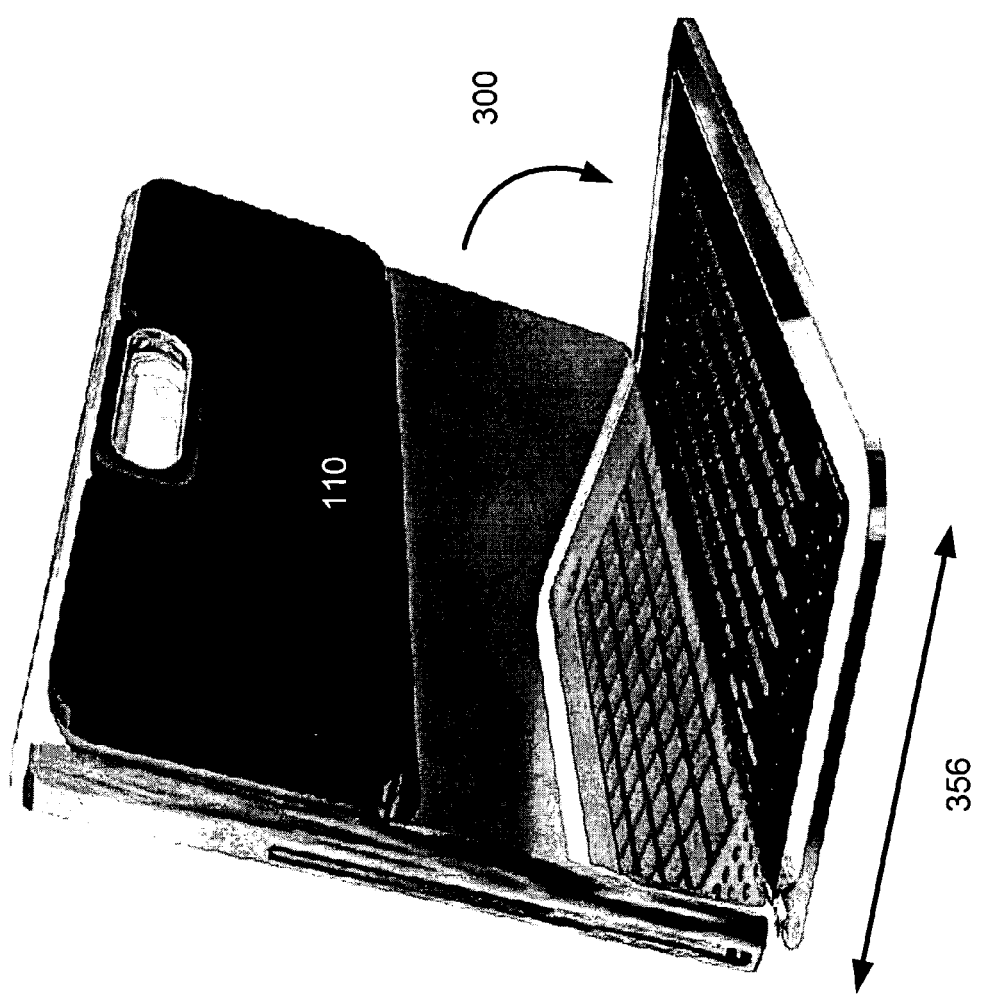
Figure 3F:
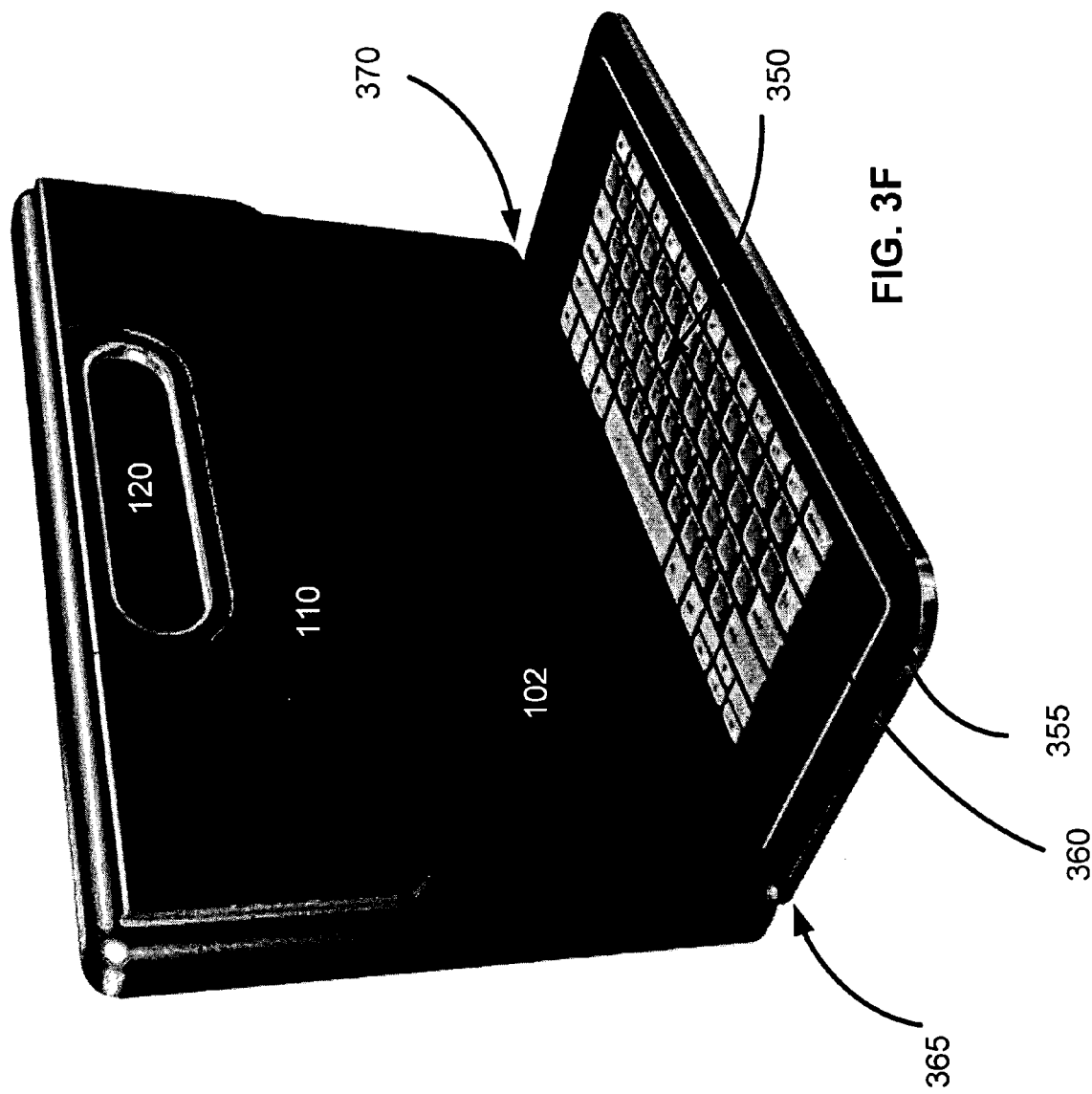

FIGS. 3D to 3F illustrate examples of the lower panel 110 at various angles 300 relative to the back side 102, in accordance with one embodiment. For one embodiment, the lower panel 110 may include a keyboard tray 360 and a stand 355. When the angle 300 is sufficiently large, the lower panel 110 may expose the keyboard tray 360 and the stand 355. The keyboard tray 360 may include a full-size keyboard 350 as is typically used with a desktop computer. The keyboard tray 360 may also include other accessory devices that may be used with the computer system 100. The stand 355 may surround the keyboard tray 360 on three sides and leaving the side bordering the bottom edge 130 open. The stand 355 may be attached to the back side 102 or bottom (not shown) of the computer system 100 at a first end 365 and at a second end 370 of the stand 355. This attachment may be the same attachment or hinge mechanism used to attach the lower panel 115 to the computer system 100.

Figure 4B:
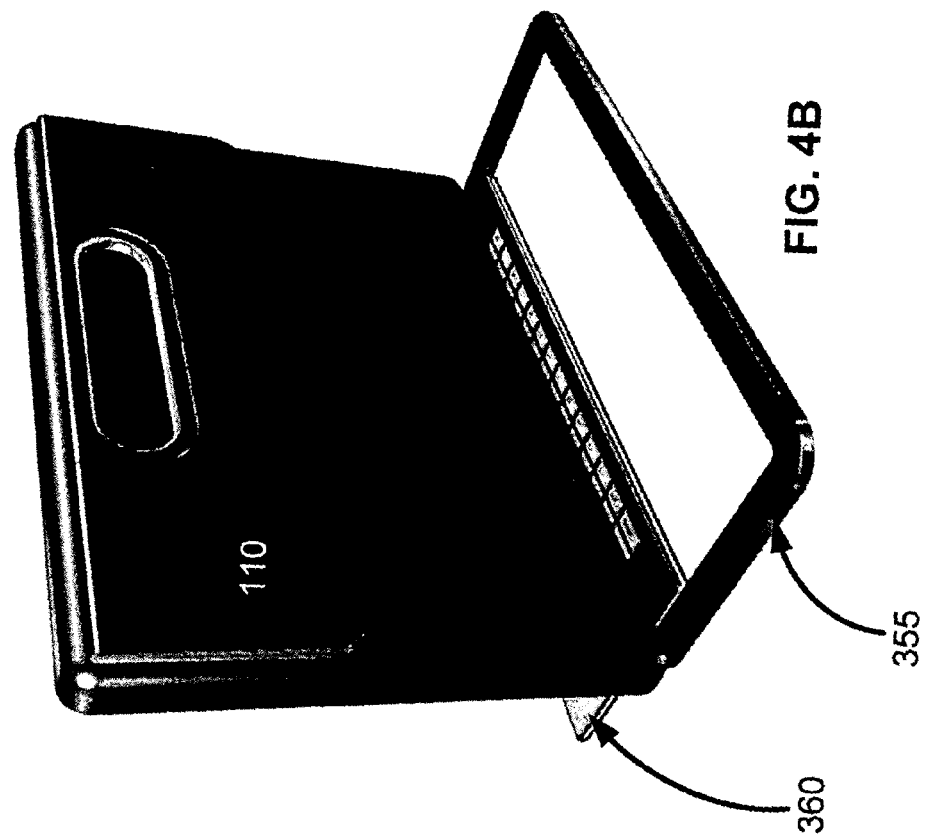
FIGS. 4A to 4C illustrates examples of different positions of the keyboard tray as it is being slid out of the stand and away from the lower panel, in accordance with one embodiment.
Figure 4A:
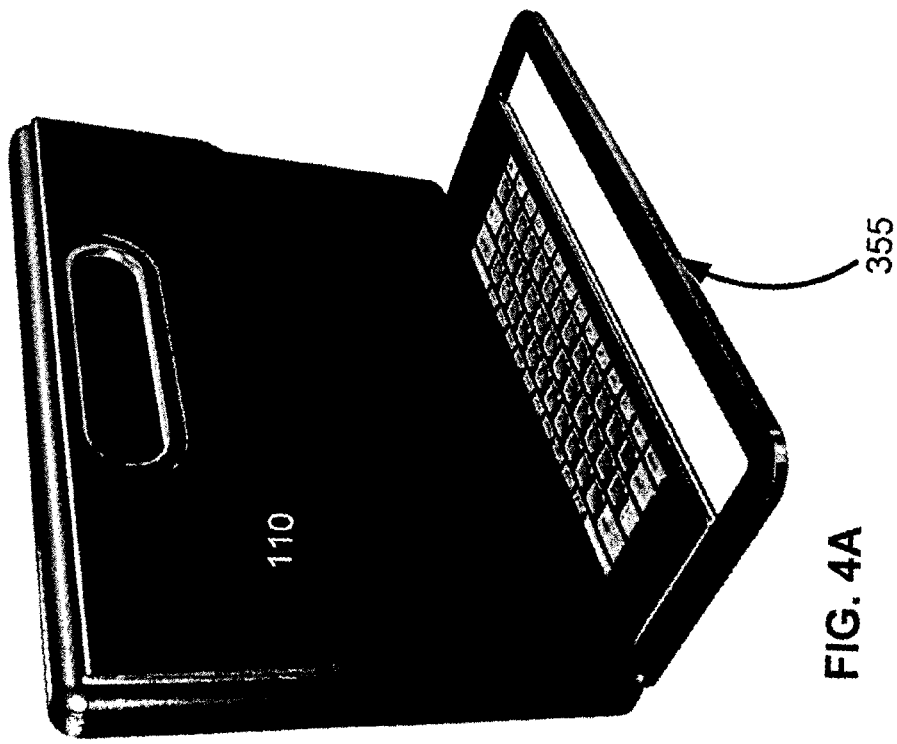
Figure 4C:
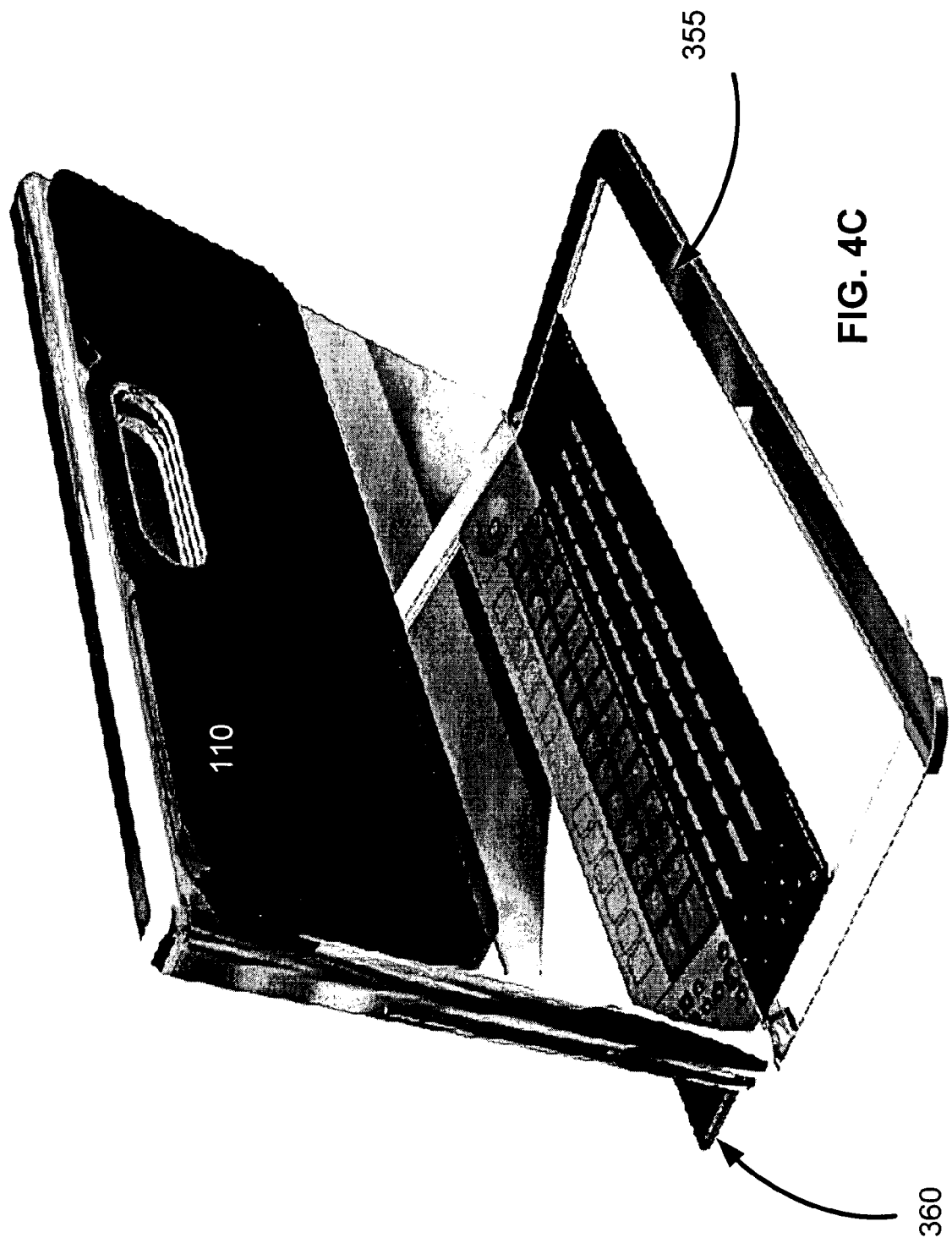
Figure 4D:
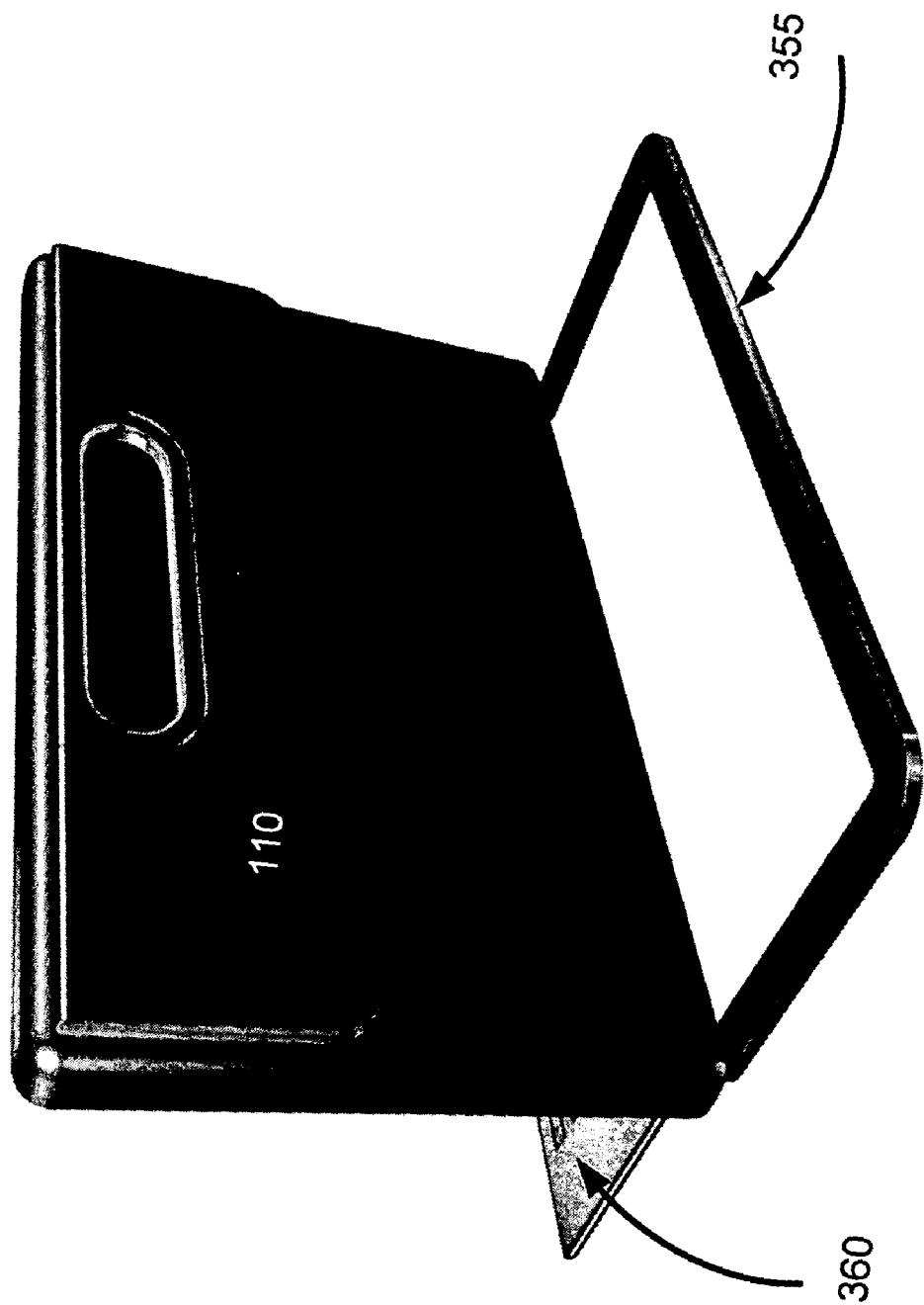
FIGS. 4D to 4E illustrates examples of the keyboard tray out from the stand, in accordance with another embodiment.
Figure 4E:
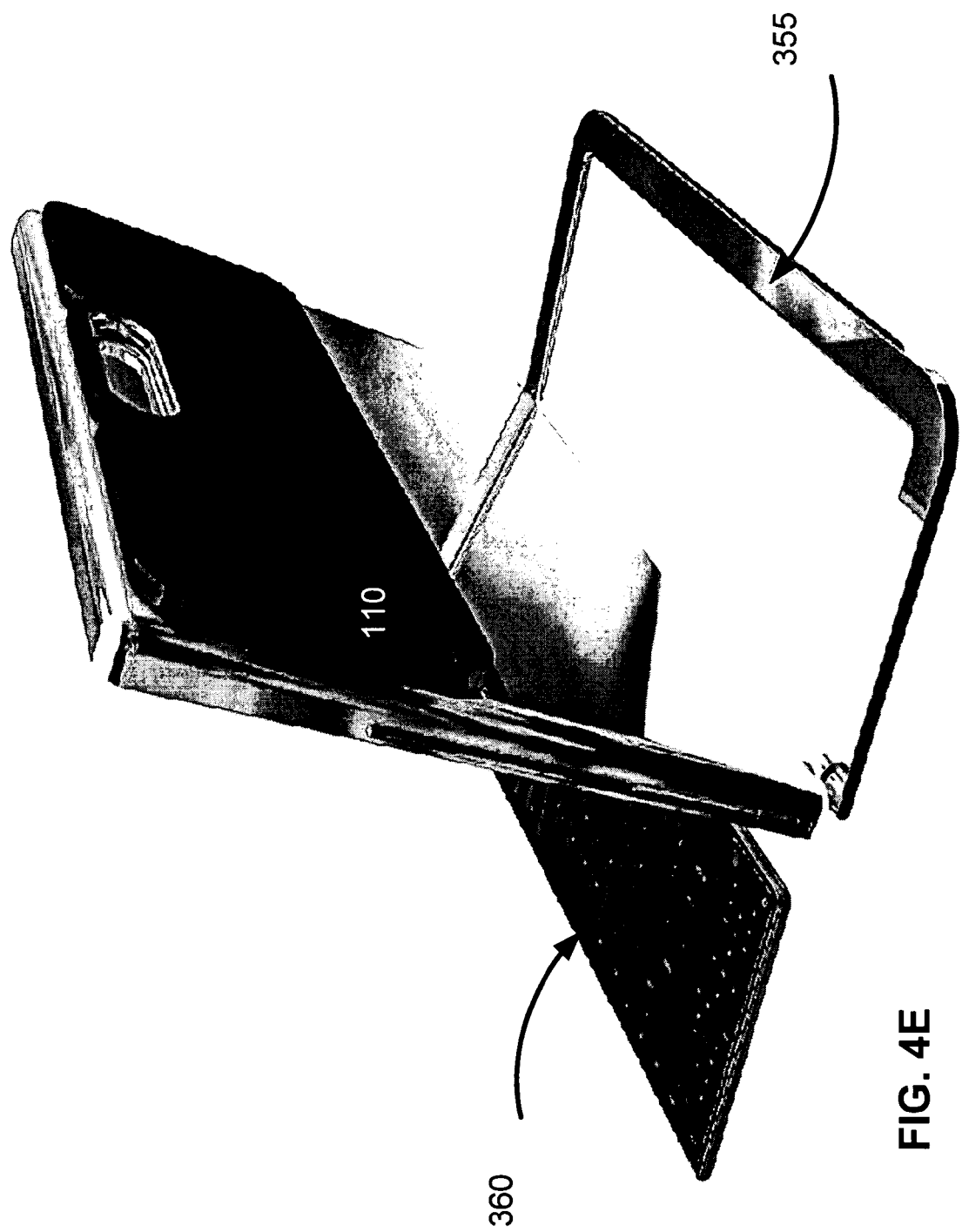

For one embodiment, the keyboard tray 360 may be engaged to or disengaged from the stand 355 using a locking mechanism (not shown). When disengaged, the keyboard tray 360 may slide out of the stand 355 at the opening bordering the bottom edge 130. FIGS. 4A to 4C illustrates examples of different positions of the keyboard tray 360 as it is being slid or extracted out of the stand 355 and away from the lower panel 115, in accordance with one embodiment. FIGS. 4D to 4E illustrates examples of the keyboard tray 360 out from the stand 355, in accordance with another embodiment. The attachment or hinge mechanism that attaches the lower panel 115 (or the stand 355) to the computer system 100 may need to be flexible enough to permit the stand 355 to unfold with ease while at the same time strong enough to permit the stand 355 to support the weight of the housing 103. For one embodiment, the width 356 of the stand may need to be large enough to support the weight of the housing 103 so as to prevent the housing 103 to fall over toward its back side 102.

Front Side of the Housing

Figure 5A:
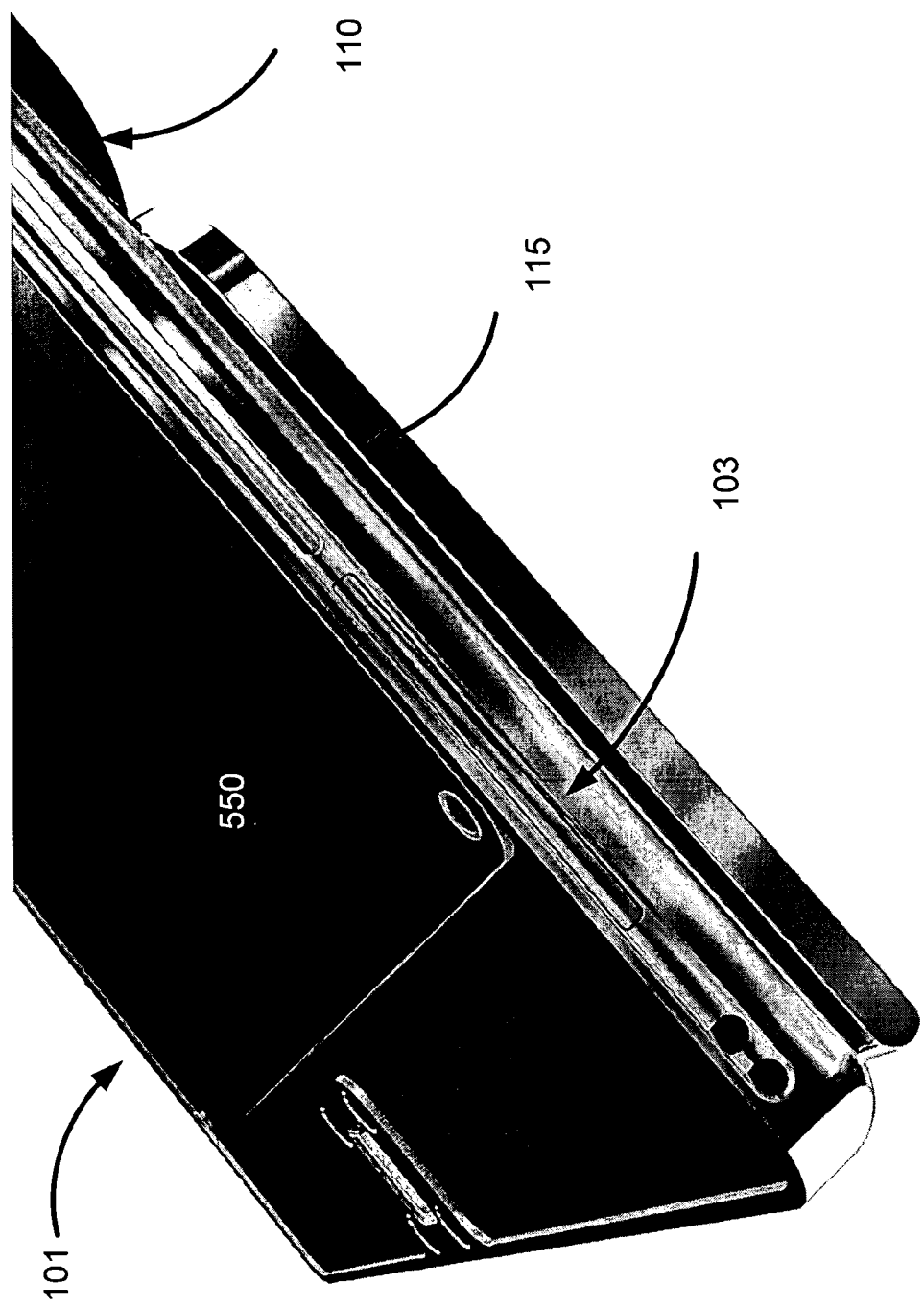
FIG. 5A illustrates an example of a side view of the computer system, in accordance with one embodiment.

FIG. 5A illustrates an example of a side view of the computer system 100, in accordance with one embodiment. For one embodiment, the front side 101 of the housing 103 may include a display 550. The display 550 may be flat and may be a liquid crystal display (LCD), plasma display, or another type of display. The display 550 may be a large display with its size being, for example, 17", 21", or larger. The large display size may enable a user of the computer system 100 to have an experience as if the user is using a typical desktop computer. The large display size may also enable the user to have an experience as if the user is watching a television screen. It may be noted that the lower panel 115 of the computer system 100 as illustrated in FIG. 5A is completely folded.

Authentication Sensor

Figure 5B:
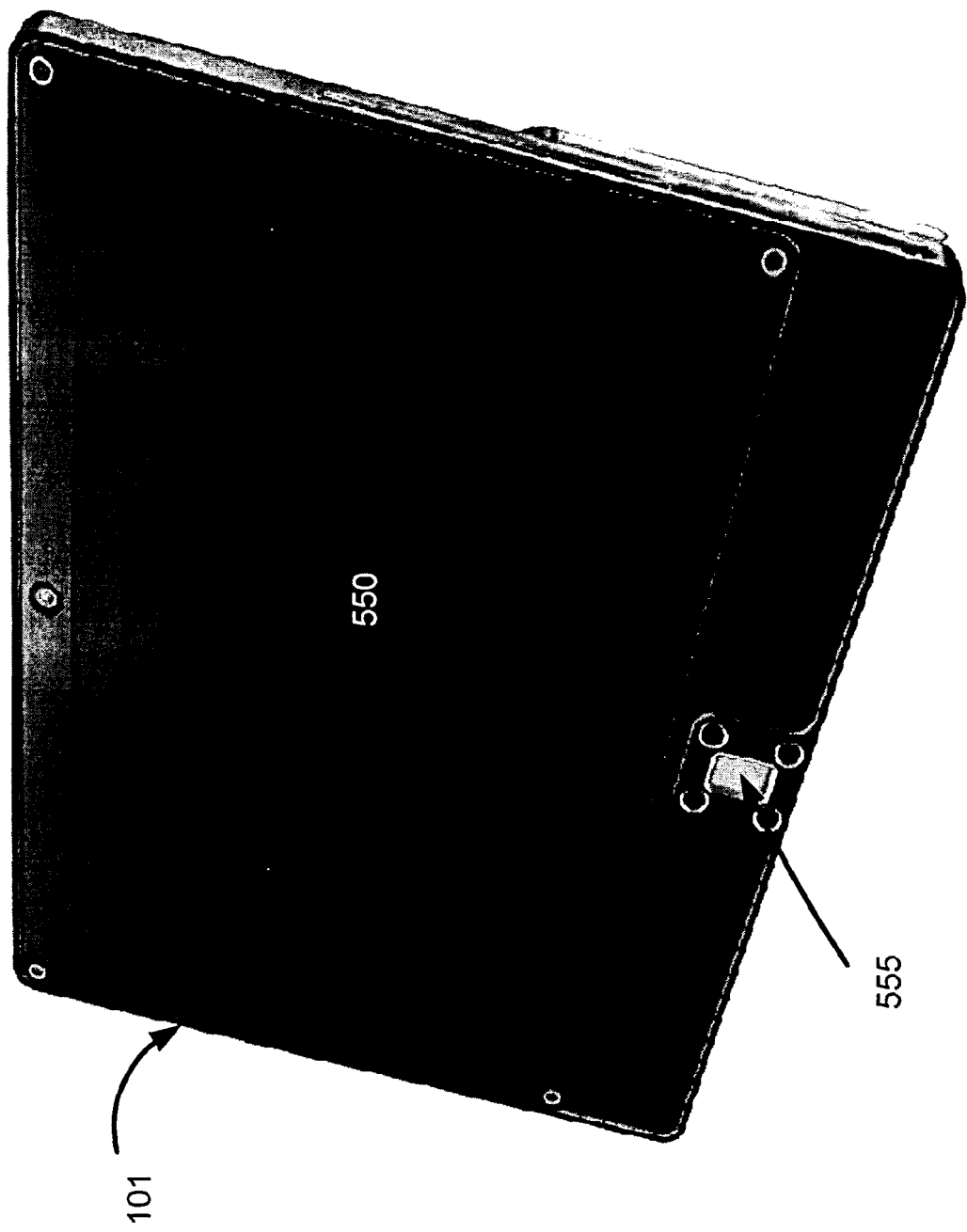
FIG. 5B illustrates an example of the front side of the housing of the computer system, in accordance with one embodiment.
Figure 5C:
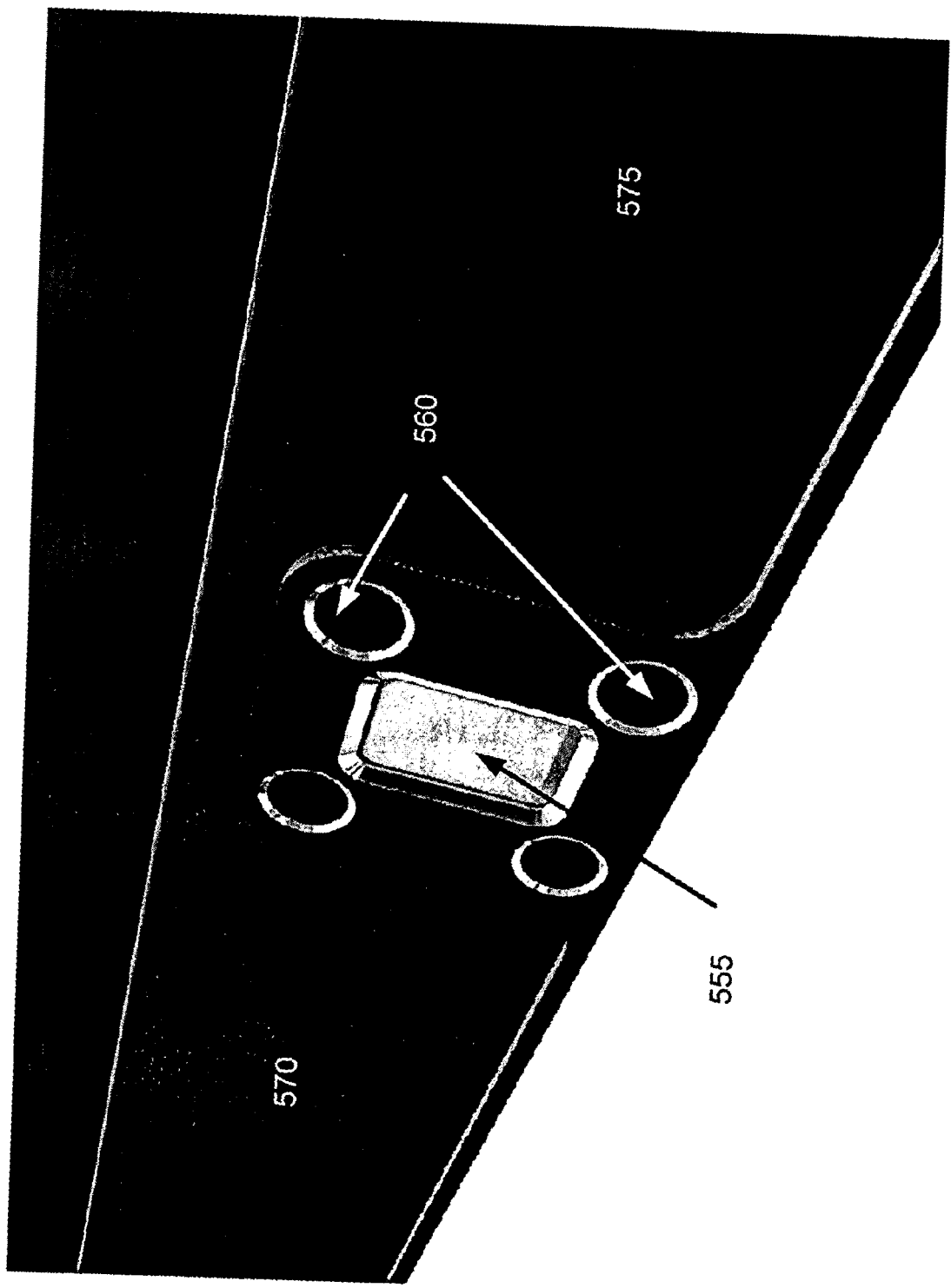
FIG. 5C illustrates a close-up view of one example of a sensor, in accordance with one embodiment.

FIG. 5B illustrates an example of the front side 101 of the housing 103 of the computer system 100, in accordance with one embodiment. For one embodiment, the front side 101 may also include a sensor 555 to enable access authentication. The sensor 555 may be a fingerprint sensor. In this example, the sensor 555 may be located below the display 550. One skilled in the art may recognize that the sensor 555 may also be located elsewhere on the housing 103. For example, the sensor 555 may be located by the side of the display 550. FIG. 5C illustrates a close-up view of one example of a sensor 555, in accordance with one embodiment.

Integrated Speaker

Although not shown, the front side 101 may also include one or more integrated speakers. For one embodiment the speakers may be located in the area near the sensor 555 and below the display 550. For example, the speakers may be located at locations 570 and 575. The speakers may be hidden underneath a grid on the front side 101 of the computer system 100. The speakers may be used by applications (e.g., multimedia applications, game applications, etc.) to provide high quality sound.

Figure 5D:
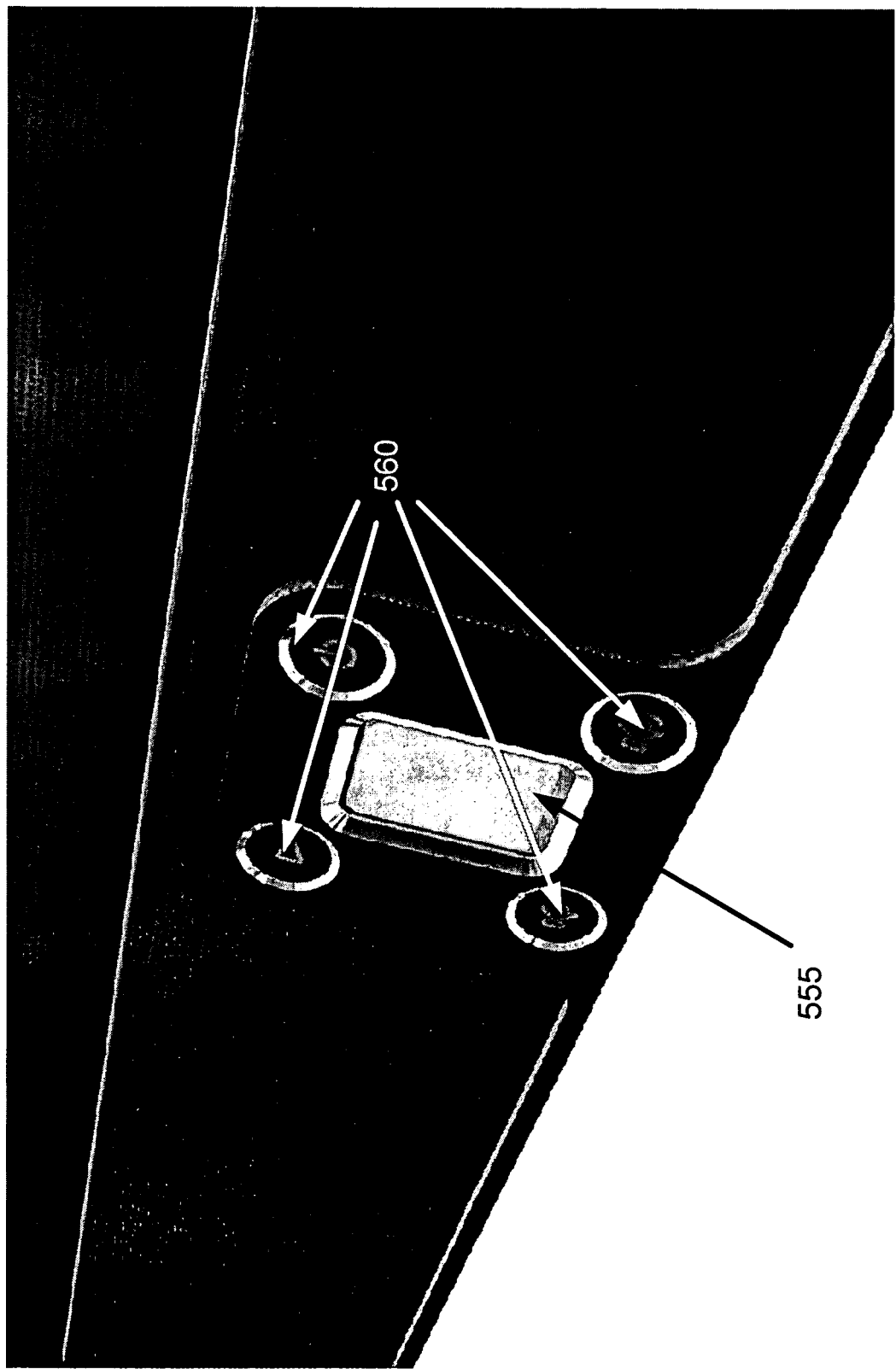
FIG. 5D illustrates a close-up view of the status indicators, in accordance with one embodiment.

The front side 101 may also include one or more status indicators 560. These status indicators 560 may be used to indicate, for example, speaker status, microphone status, video camera status, etc. The status indicators 560 may illuminate to indicate, for example, an on or off condition. FIG. 5D illustrates a close-up view of the status indicators 560, in accordance with one embodiment. In the current example, the status indicators 560 are located near the sensor 555, although they may also be placed at other places on the housing 103.

Microphone and Integrated Camera

Figure 5E:
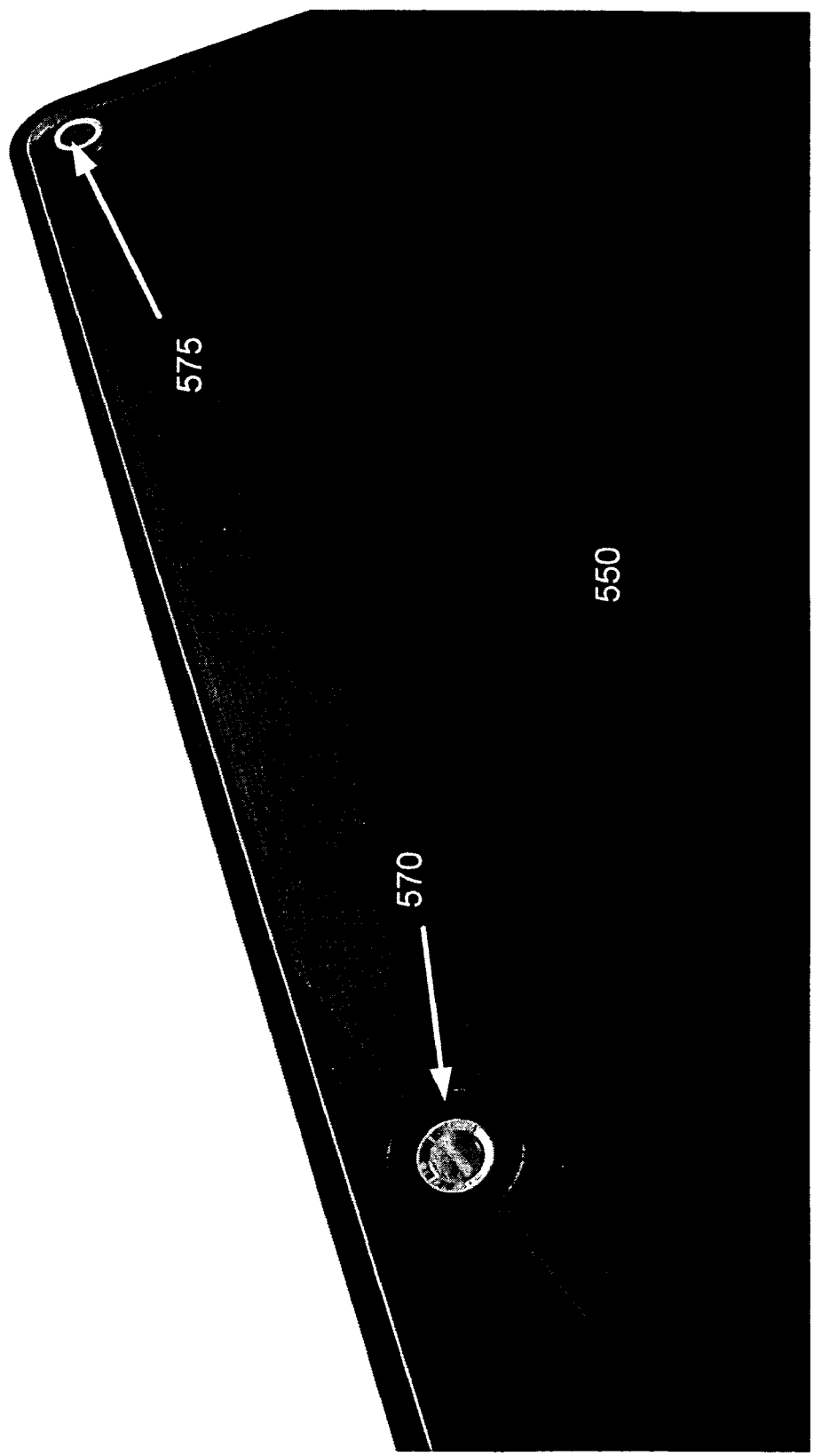
FIG. 5E illustrates an example of a computer system with an integrated video camera and one or more microphones, in accordance with one embodiment.

FIG. 5E illustrates an example of a computer system with an integrated video camera and one or more microphones, in accordance with one embodiment. The front side 101 of the computer system 100 may include an integrated video camera 570. The video camera 570 may be used for video conferencing or any type of interaction that may need one or more images to be captured. For example, the video camera 570 may be used to detect user presence or to authenticate a user for access. In this example, the computer system 100 may include biometric recognition software to authenticate a user for instant access without the usual requirement of a user identification number and a password. For one embodiment, the video camera 570 may be controlled by software to point at different angles in front of the computer system 100.

Figure 5F:
FIG. 5F illustrates another example where a microphone may be located, in accordance with one embodiment.

For one embodiment, the front side 101 of the computer system 100 may also include one or more microphones 575 (referred to herein as an array of microphones 575). The array of microphones 575 is placed on the front side 101 to enable them pick up sound from various angles relative to the front side 101. The array of microphones 575 may also enable the computer system 100 to approximate a location of a sound source and to control the video camera 570 to point in the direction of the sound source. The array of microphones 575 may enable a user to give voice commands to the computer system 100. For one embodiment, the microphones in the array of microphones may be placed around the display 550. For another embodiment, the array of microphones 575 may be placed away from a location where undesirable noise is frequently generated (e.g., cooling fan, etc.). FIG. 5F illustrates another example where a microphone may be located, in accordance with one embodiment. For one embodiment, the array of microphones 575 may include having a microphone placed at each corner of the front side 101, as illustrated in FIG. 6B. One skilled in the art may recognize that the array of microphones 575 may also be placed at other locations. The combination of the video camera 570 and the array of microphones 575 may enable a user to have hands free interactions with the computer system 100.

Keyboard

Figure 6A:
FIGS. 6A to 6B illustrate front view examples of the computer system, in accordance with one embodiment.
Figure 6B:
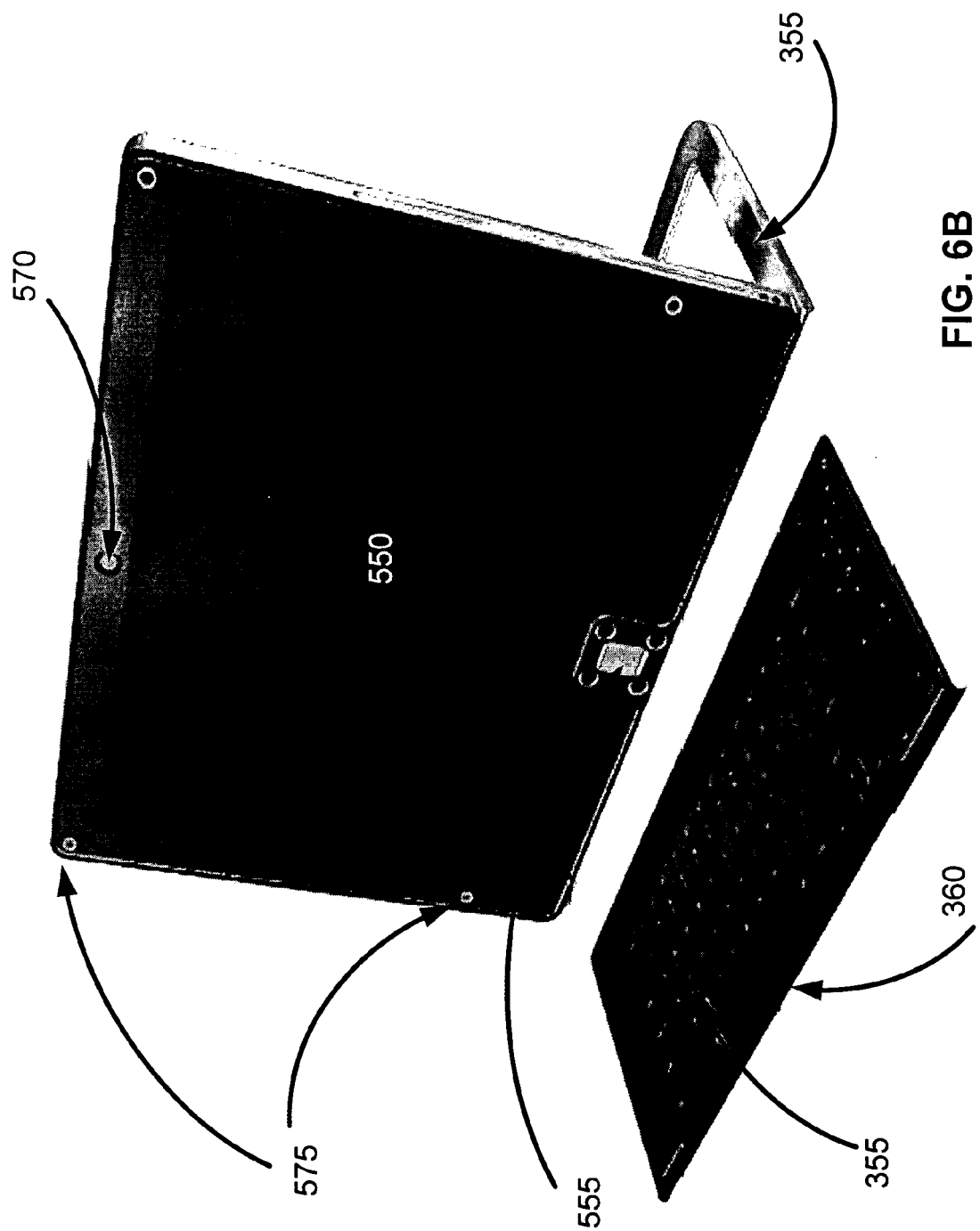
Figure 7C:
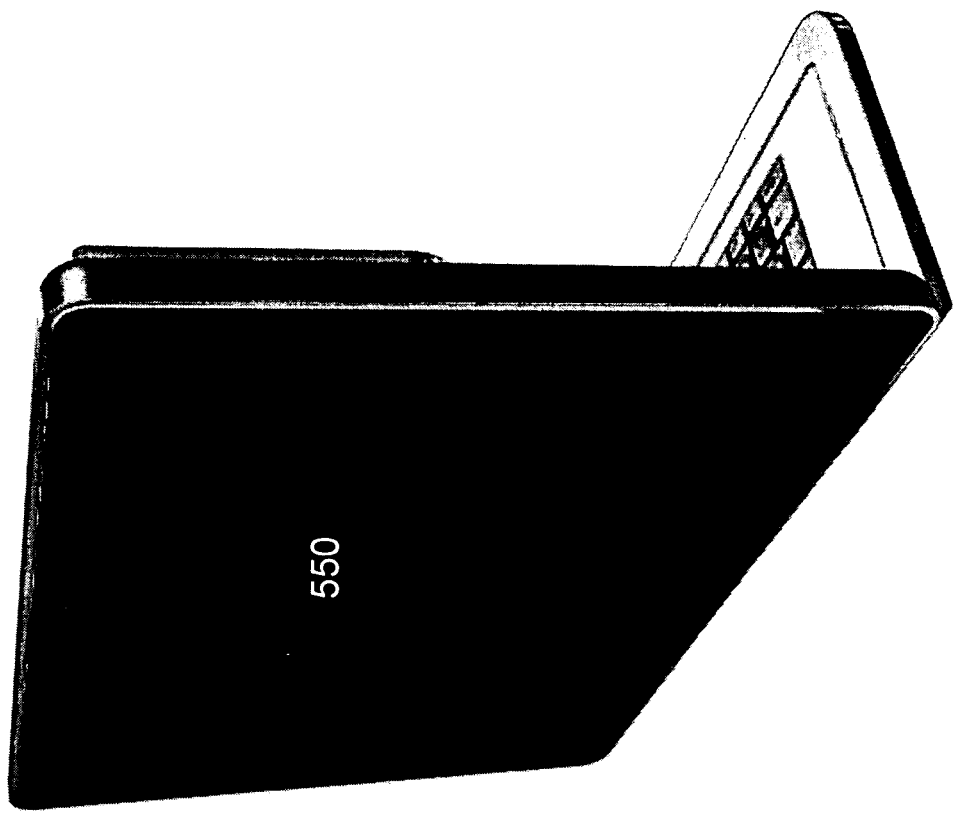
FIG. 7C illustrates an example of the keyboard tray being fully retracted into the lower panel, in accordance with one embodiment.
Figure 7B:
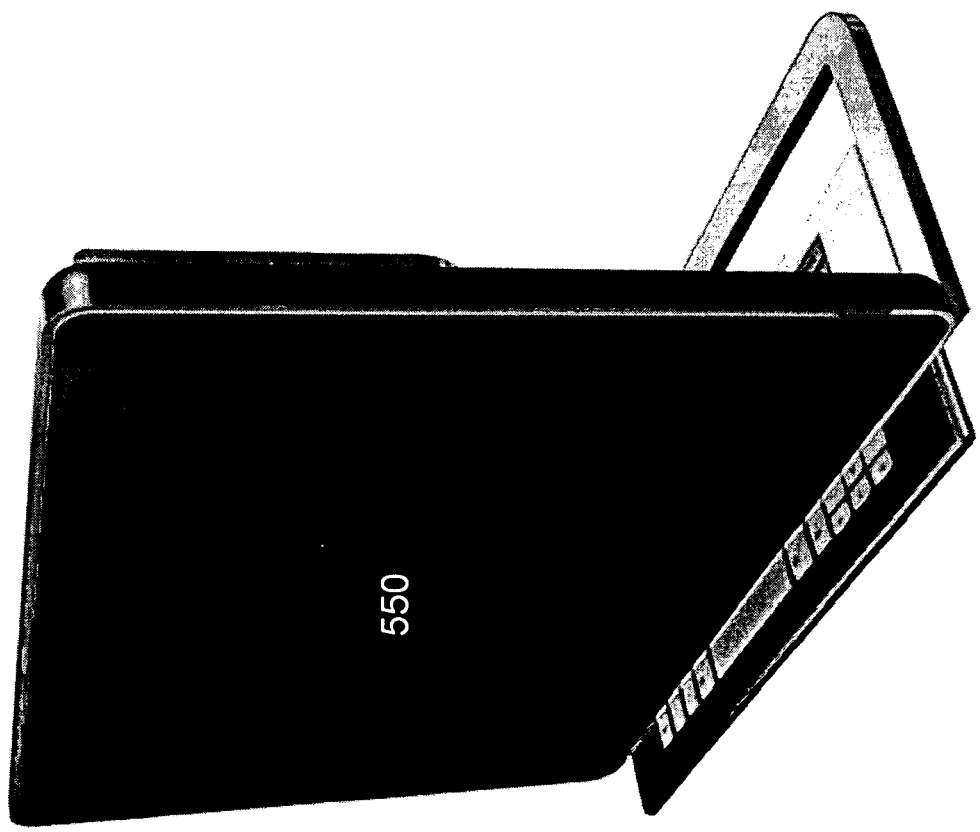

FIGS. 6A to 6B illustrate front view examples of the computer system 100, in accordance with one embodiment. In this example, the keyboard tray 360 is illustrated as being in front of the computer system 100 and completely outside of the stand 355. As the keyboard tray 360 may be extracted out of the stand 355, it may also be retracted into the stand 355. FIGS. 7A to 7B illustrates examples of the keyboard tray 360 being partially retracted into the stand 355, in accordance with one embodiment. FIG. 7C illustrates an example of the keyboard tray 360 being fully retracted into the stand 355, in accordance with one embodiment. For one embodiment, the keyboard 350 may be a wireless keyboard. This may reduce the distance constraint typically associated with a wired keyboard and may provide a user of the computer system 100 more freedom and flexibility as to how and where they may want to use the keyboard 350.

Figure 8A:
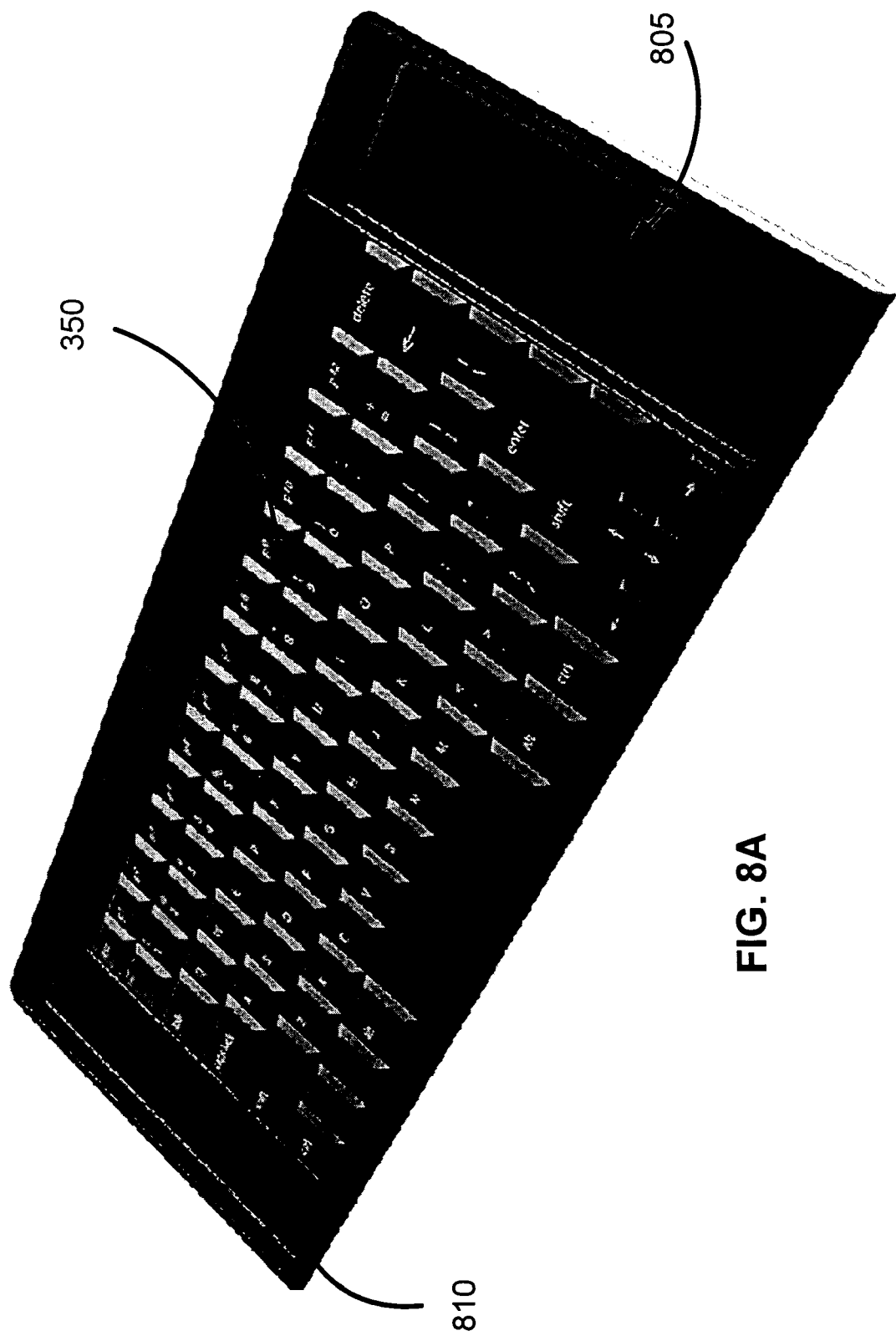
FIG. 8A illustrates an example of a close-up view of the keyboard tray, in accordance with one embodiment.

FIG. 8A illustrates an example of a close-up view of the keyboard tray 360, in accordance with one embodiment. As mentioned above, In addition to the keyboard 350, the keyboard tray 360 may include other accessory devices that may be used with the computer system 100. For one embodiment, the keyboard tray 360 may include a right receptacle 805 and a left receptacle 810 to hold one or more accessory devices. The keyboard 350 may be integrated into the keyboard tray 360. Alternatively, the keyboard 350 may sit in a keyboard receptacle (not shown) of the keyboard tray 360 and may be lifted off the keyboard receptacle and removed from the keyboard tray 360.

Remote Controller

Figure 8B:
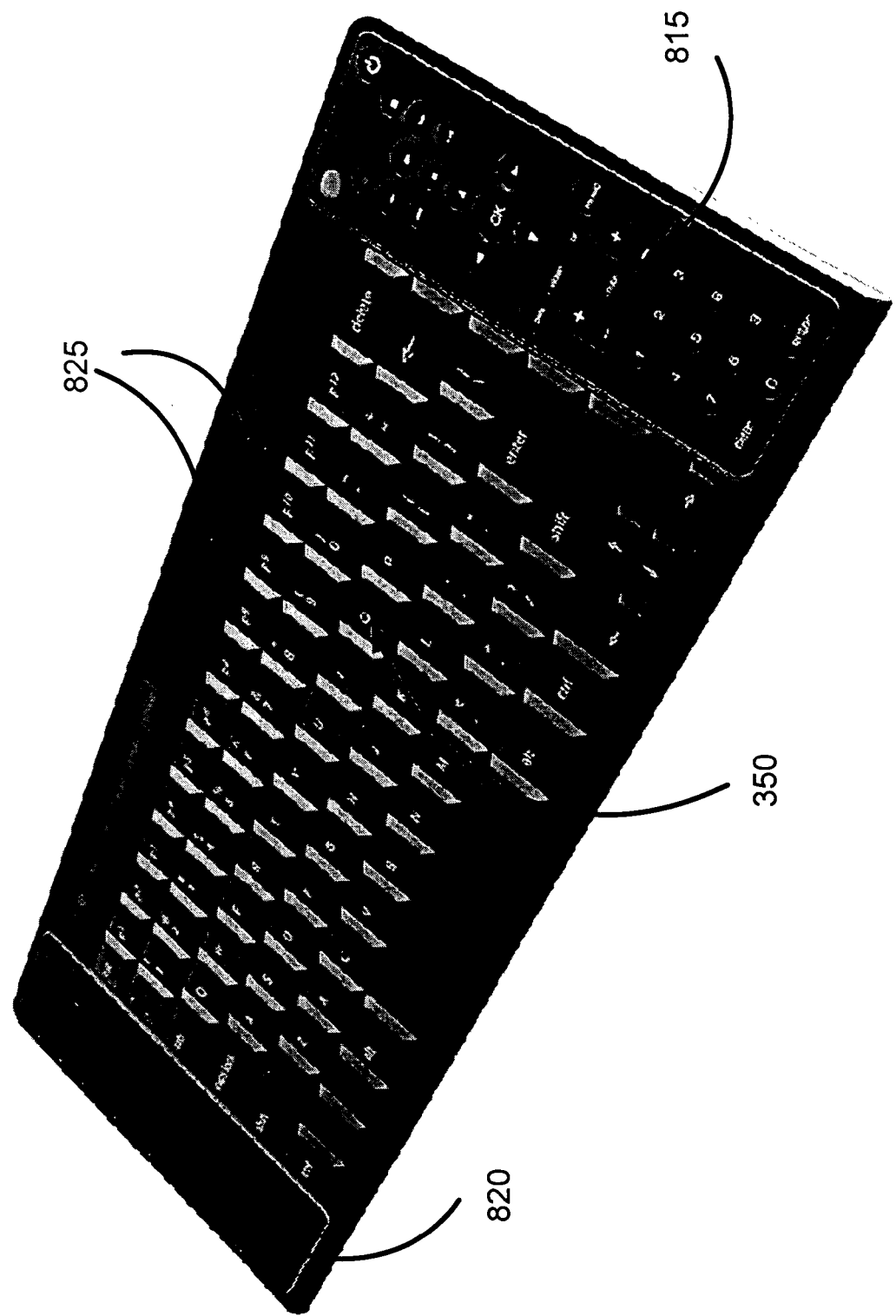
FIG. 8B illustrates an example of a close-up view of the keyboard tray with a remote controller and a telephone handset, in accordance with one embodiment.

FIG. 8B illustrates an example of a close-up view of the keyboard tray 360 with a remote controller 815 and a telephone handset 820, in accordance with one embodiment. The keyboard 350 may include status indicators 825 that may indicate status of various components of the keyboard 350 and/or of the computer system 100. For example, the status indicators 825 may indicate that "caps lock" is on or that the computer system is in a suspend mode, etc.

The remote controller 805 may enable a user to remotely interact with the computer system 100. For one embodiment, the computer system 100 may include a media or entertainment center software. For example, the computer system 100 may include Windows XP Media Center software from Microsoft Corporation of Redmond, Wash. The media or entertainment software may provide an interface to allow a user to navigate, select and playback using the remote controller 805. Communication between the remote controller 805 and the computer system 100 may be performed using an infrared (IR) remote-control protocol.

The media or entertainment center software may enable the computer system 100 to act as a media client or a media server. When acting as a media client, the user may use the remote controller 805 to select songs, television programs, etc. It may be noted that the user may also use the keyboard 350 to manage media files stored in the computer system 100. When acting as a media server, the user may use the remote controller 805 to interface with the computer system 100 and control play back on other devices.

Figure 8C:
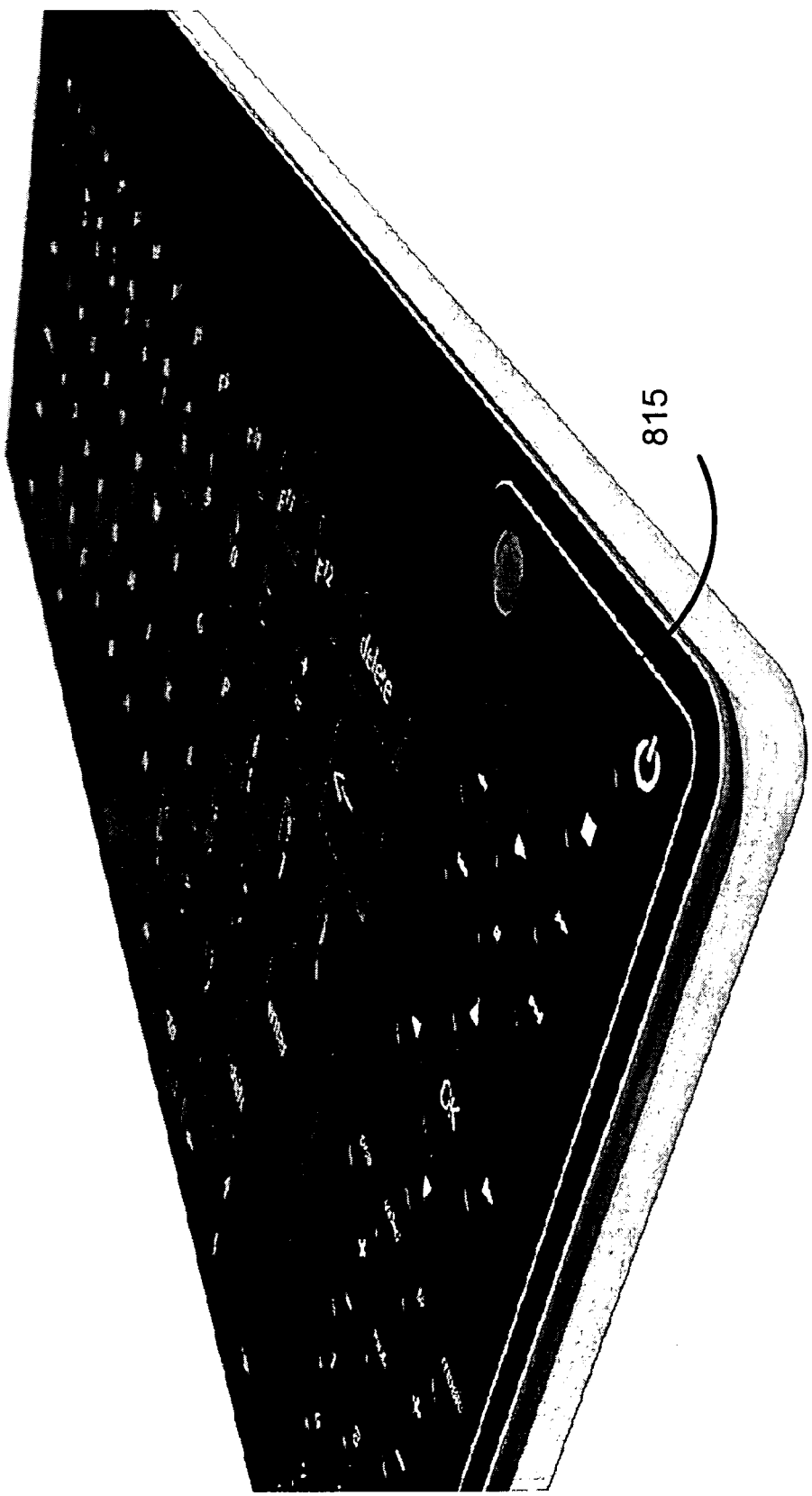
FIG. 8C illustrates a close-up view of the remote controller sitting in a receptacle in the keyboard tray, in accordance with one embodiment.
Figure 8D:
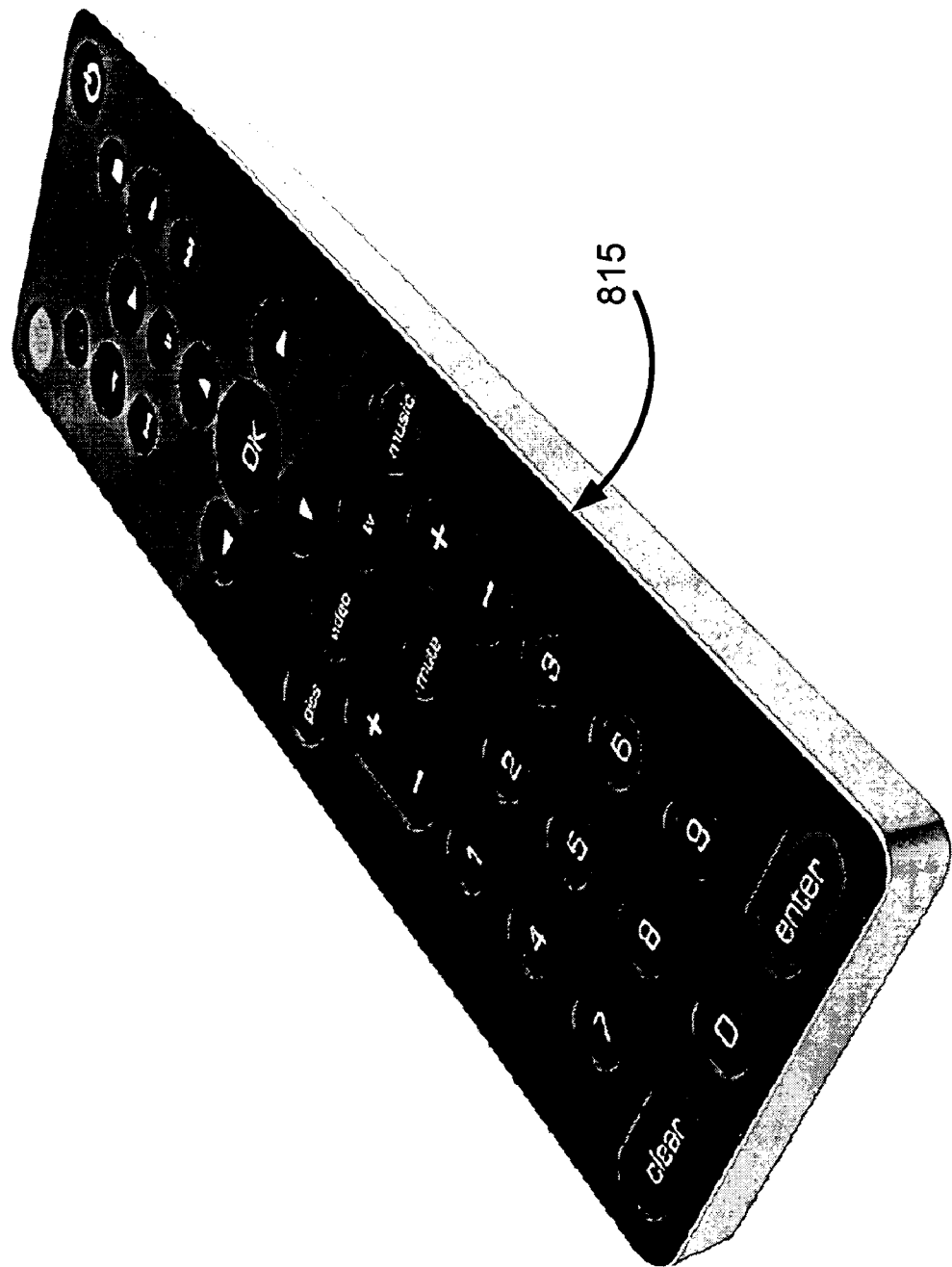
FIG. 8D illustrates a close-up view of the front side or face of the remote controller by itself, in accordance with one embodiment.

FIG. 8C illustrates a close-up view of the remote controller 805 sitting in a receptacle in the keyboard tray 360, in accordance with one embodiment. FIG. 8D illustrates a close-up view of the front side or face of the remote controller 805, in accordance with one embodiment. The remote controller 805 may include the normal navigation buttons, numeric buttons, etc. as may typically be provided with, for example, a standard audio video remote controller.

Figure 8E:
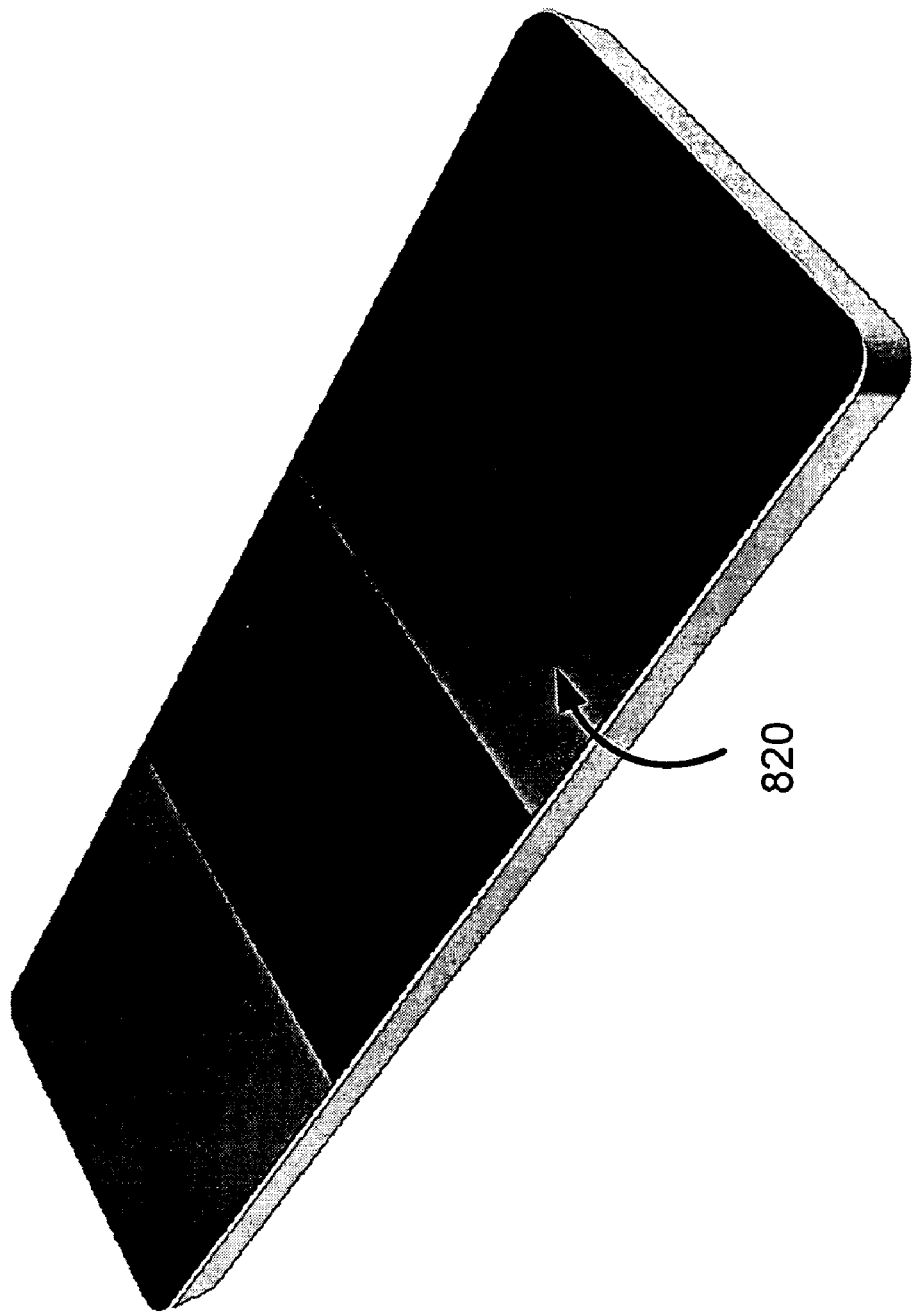
FIG. 8E illustrates a close-up view of the back side of the remote controller, in accordance with one embodiment.

FIG. 8E illustrates a close-up view of the back side 820 of the remote controller 805, in accordance with one embodiment. For one embodiment, the back side 820 of the remote controller 805 may be used as a mouse pad. For example, an external mouse or a cursor control device (not shown) may use the back side 820 of the remote controller 805 as a mouse pad to control position of a cursor.

Telephone Handset

Figure 9A:
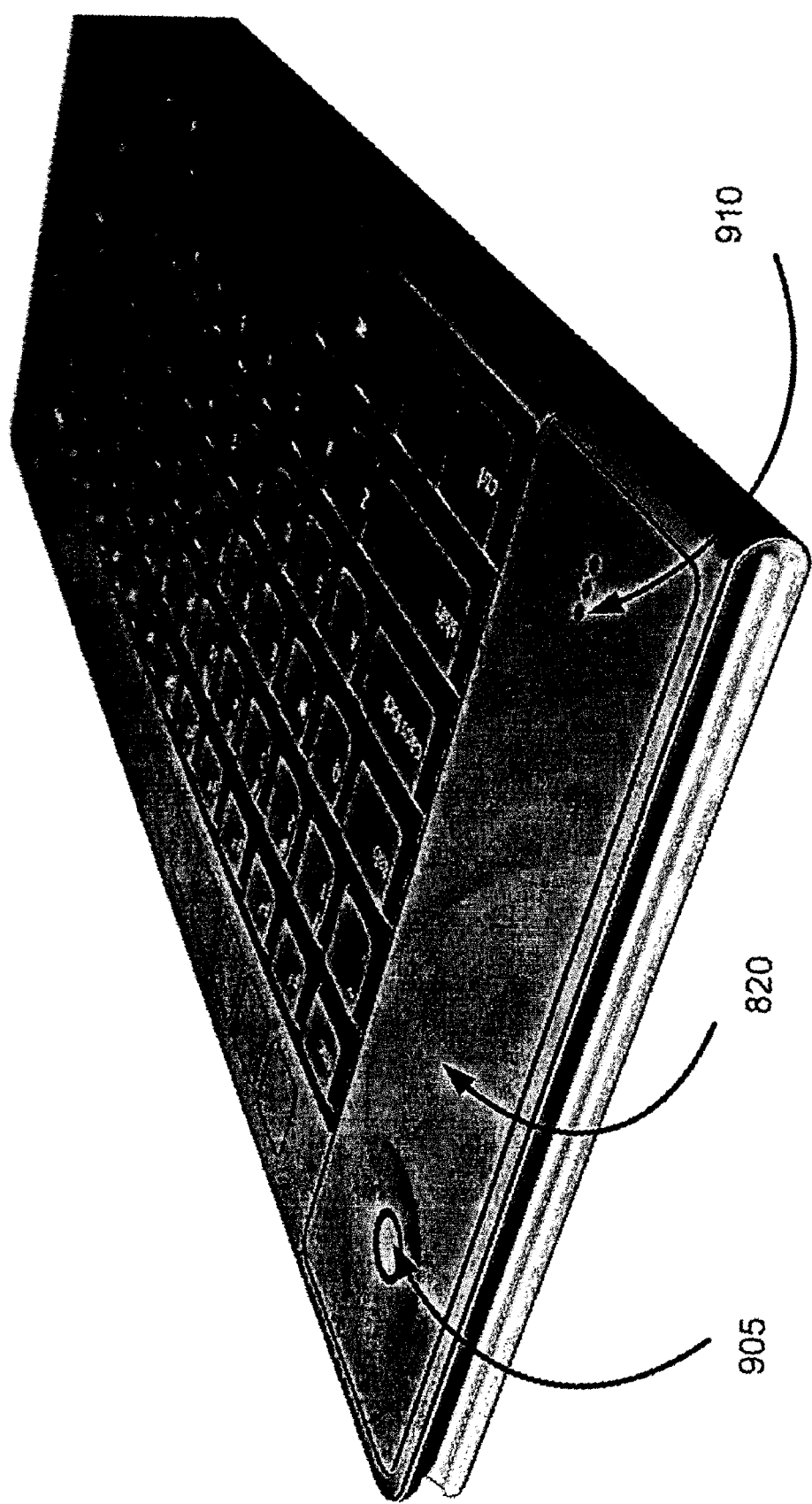
FIG. 9A illustrates an example of a close-up view of the keyboard tray with the telephone handset, in accordance with one embodiment.

FIG. 9A illustrates an example of a close-up view of the keyboard tray 360 with the telephone handset 820, in accordance with one embodiment. The telephone handset 820 as illustrated is in its receptacle in the keyboard tray 360. The telephone handset 820 may include a mouth piece 905 and an ear piece 910 and may enable a user to make voice calls via the computer system 100. For one embodiment, telephone handset 820 may include a wireless communication module (e.g., Bluetooth communication module, etc.), and the communication between the telephone handset 820 and the computer system 100 may be established using a short range wireless communication protocol such as, for example, Bluetooth protocol. Bluetooth is the name for a technology specification for small form factor, low-cost, short-range radio links between mobile PDAs, PCs, mobile phones and other portable devices which is published by the Bluetooth SIG Inc. and standardized by the IEEE as 802.15.1. For another embodiment, the conversation carried out by the user using the telephone handset 820 may be established using voice over Internet Protocol (VoIP) over the WLAN connection.

Figure 9B:
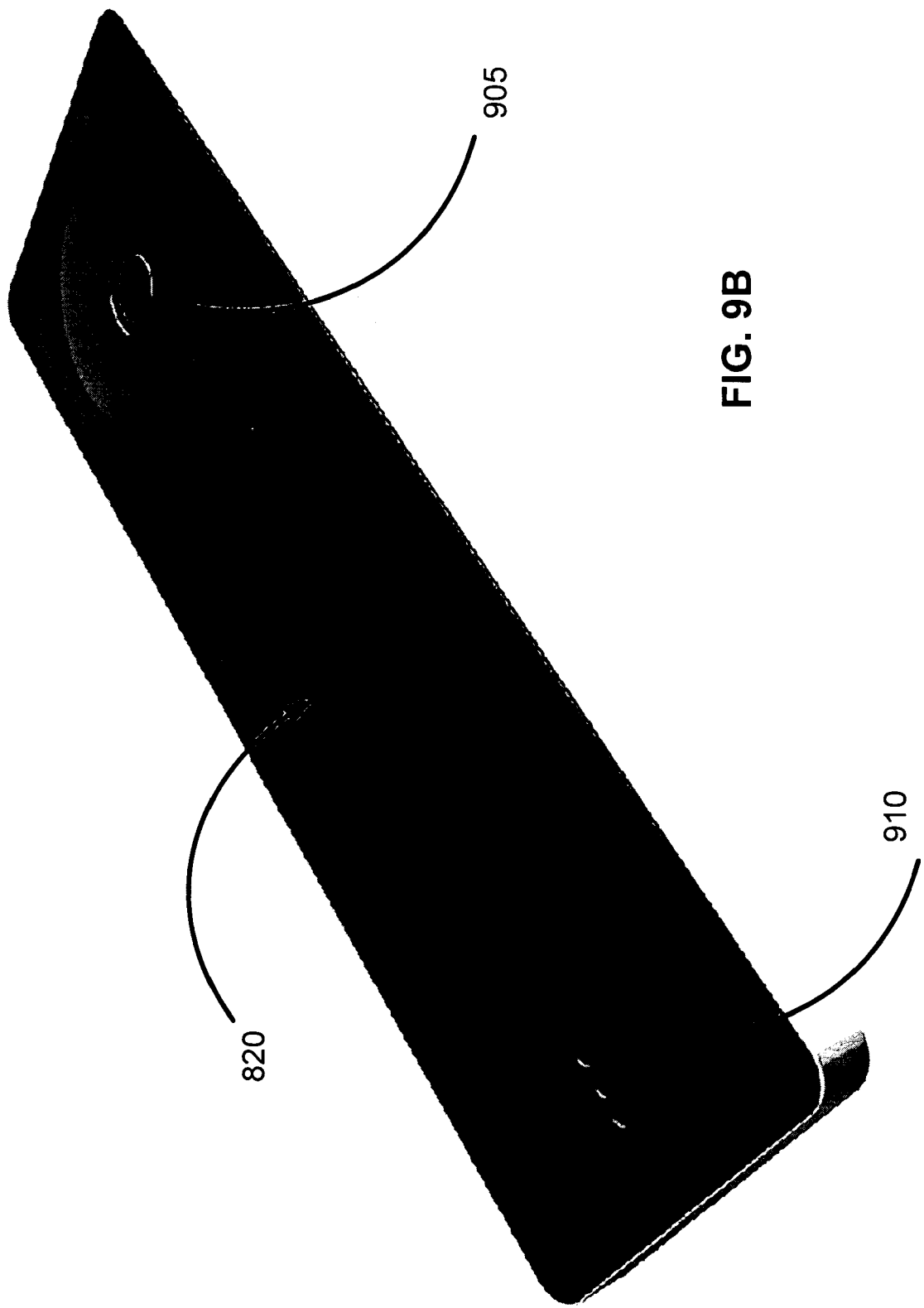
FIG. 9B illustrates a close-up view of the front side or face of the telephone handset, in accordance with one embodiment.
Figure 9C:
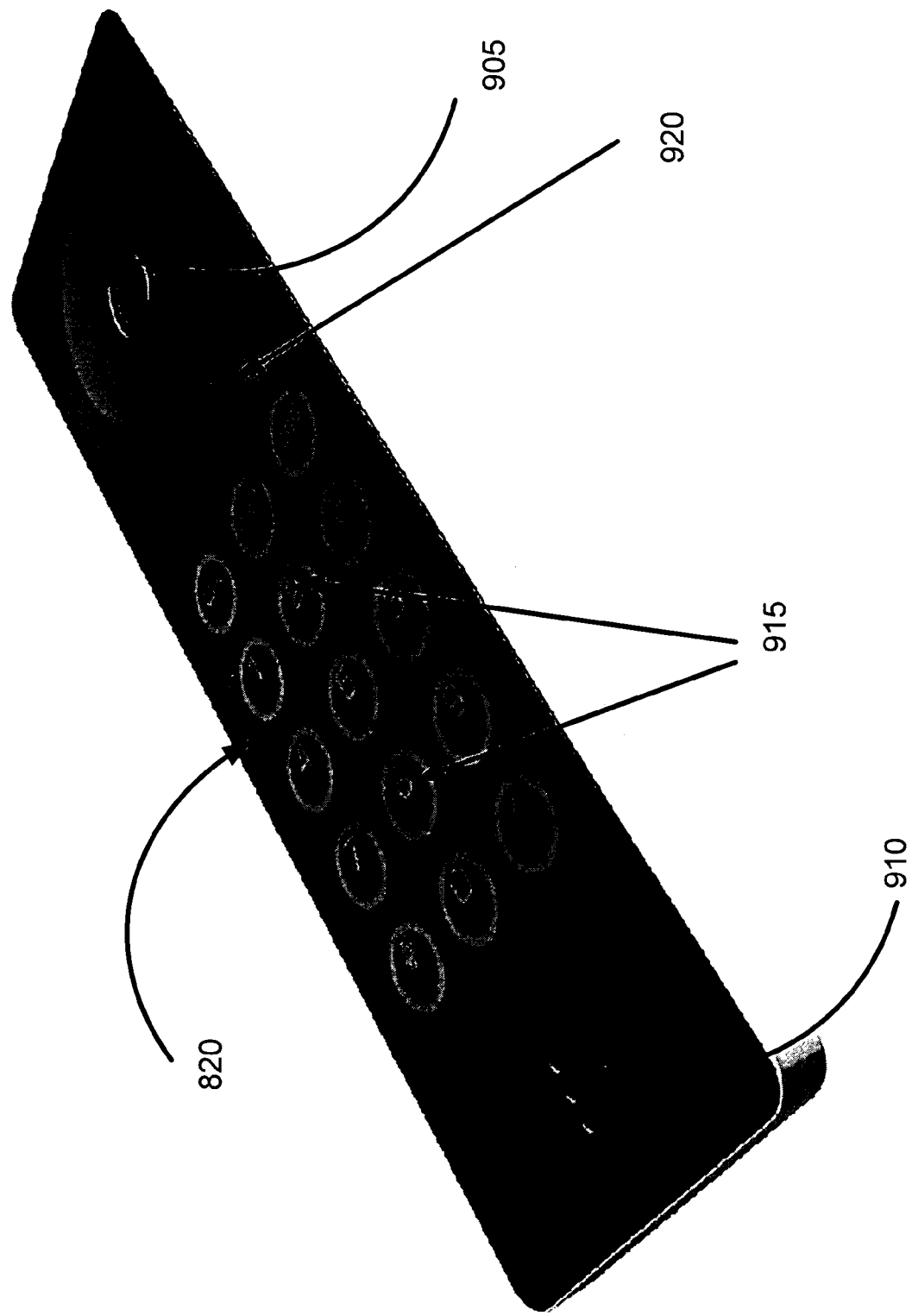
FIG. 9C illustrates a close-up view of the front side or face of the telephone handset when the telephone interface is activated, in accordance with one embodiment.

FIG. 9B illustrates a close-up view of the front side or face of the telephone handset 820, in accordance with one embodiment. In this view, there is no information displayed on the face of the telephone handset 820. FIG. 9C illustrates another close-up view of the front side or face of the telephone handset 820, in accordance with one embodiment. In this view, the telephone interface may be activated and information may be illuminated on the face of the telephone handset 820. For example, the telephone handset 820 may display the normal numeric buttons 915 for dialing telephone numbers, etc. The telephone handset 820 may also include a telephone number display area 920. Because the telephone handset 820 may be a wireless device, a user may carry out a telephone conversation while not being in front of the computer system 100.

Computer System

Figure 10:
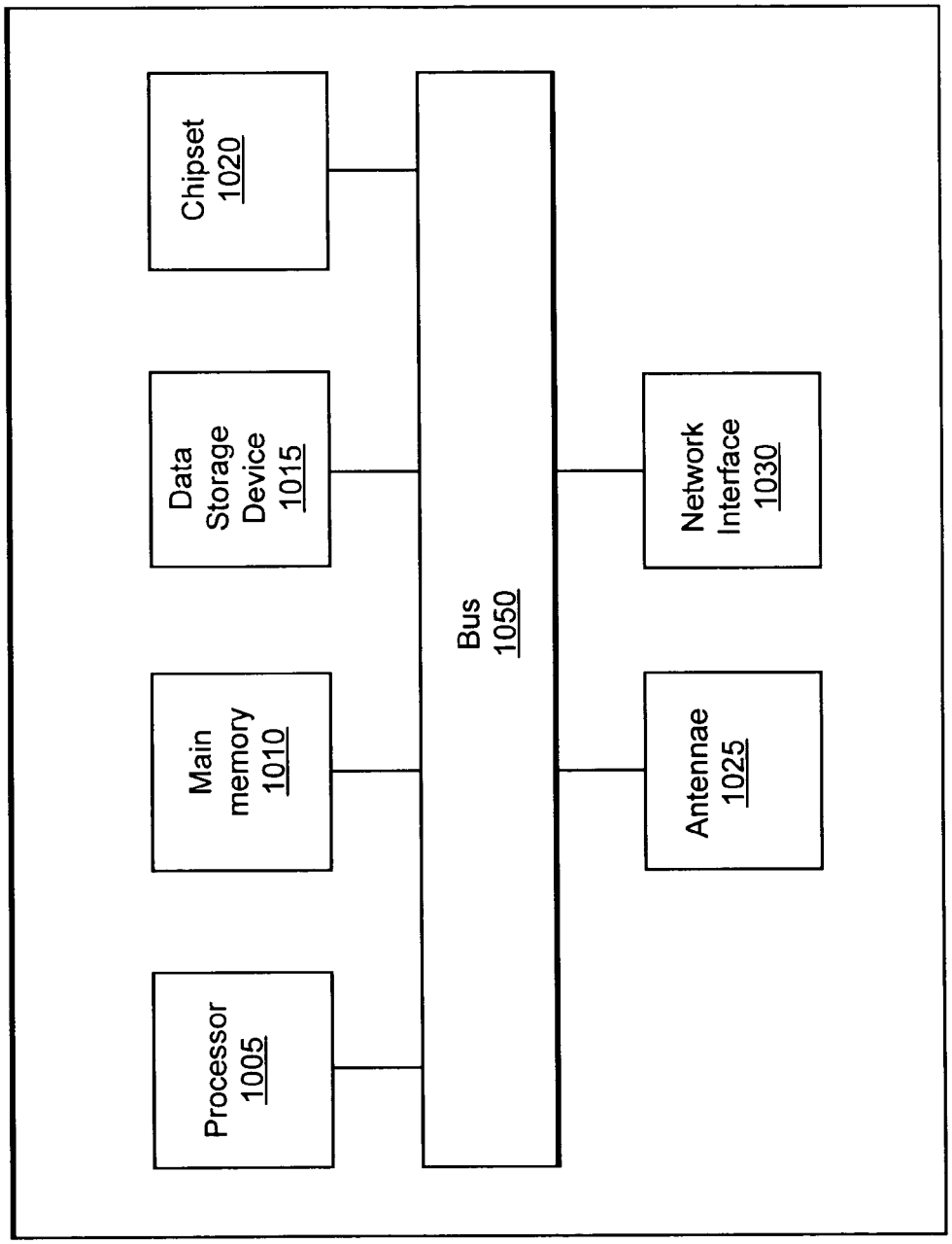
FIG. 10 illustrates an exemplary block diagram of the computer system, in accordance with one embodiment.

FIG. 10 illustrates an exemplary block diagram of the computer system 100, in accordance with one embodiment. The computer system 100 includes a processor 1005 coupled to a bus 1050. For example, the processor 1005 may be a processor in the Pentium® family of processors including the Pentium® II processor family, Pentium® IV processors, Pentium® IV processors available from Intel Corporation of Santa Clara, Calif. While the computer system 100 is illustrated with a single processor 1005, it may be possible that the computer system 100 may have multiple processors or that the processor 1005 may have multiple cores.

Main memory 1010 may also be coupled to the bus 1050 and may store data and sequences of instructions that are executed by the processor 1005 or any other device included in the computer system 100. The main memory 1010 may include random access memory (RAM), read only memory (ROM), and/or other type of memory. In addition, data storage device 1015 may also be coupled to the bus 1050 to store information and instructions. The data storage device 1015 may comprise a magnetic disk (e.g., a hard disk), optical disc (e.g., a CD-ROM) and/or digital versatile disc (DVD), etc. The computer system 100 may further include chipset 1020. The chipset 1020 may include a graphics controller (not shown) and an input/output (I/O) controller (not shown). The graphics controller may manage information to be displayed on the display 550 of the computer system 100. The I/O controller may manage I/O devices (e.g., game controller, mouse, etc.) that may be connected to the computer system 100. Connecting to the bus 1050 may also be one or more antennae 1020 and/or network interface 1025, to provide via wireless and/or wireless connections, respectively, access to a network, such as a personal area network, local area network and/or wide area network.

Instructions executed by the processor 1005 may be provided to the main memory 1010 from a machine-accessible medium, or an external storage device accessible via a remote connection (e.g., over a network via antenna 1025 and/or network interface 1030) providing access to one or more electronically-accessible media, etc. A machine-accessible medium may include any mechanism that provides (i.e., stores and/or transmits) information in a form readable by a machine (e.g., a computer). For example, a machine-accessible medium may include RAM, ROM, magnetic or optical storage medium, flash memory devices, electrical, optical, acoustical or other form of propagated signals (e.g., carrier waves, infrared signals, digital signals); etc. In alternative embodiments, hard-wired circuitry may be used in place of or in combination with the instructions, and thus the embodiments of the present invention are not limited to any specific combination of hardware circuitry and software instructions.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus, comprising:
   a keyboard tray including a wireless keyboard, the keyboard tray coupled to a stand, the keyboard tray slide-able into or out of the stand, wherein the stand is coupled to a housing at proximally a bottom edge of the housing and foldable relative to the housing, and wherein the housing includes a display screen and a carrying handle.

2. The apparatus of claim 1, wherein the stand is to support the housing in a substantially upright position.

3. The apparatus of claim 1, wherein the housing further includes an array of two or more microphones and a video camera, wherein the microphones, the video camera, and the display screen are oriented in generally same direction.

4. The apparatus of claim 1, wherein the housing further includes a wireless communication interface to receive wireless signals from a remote control.

5. The apparatus of claim 4, wherein the keyboard tray further includes the remote control and a telephone handset.

6. The apparatus of claim 5, wherein the remote control is to communicate with the wireless communication interface using Bluetooth communication protocol.

7. A system, comprising:
 a processor;
 a display coupled to the processor;
 a first communication interface coupled to the processor, wherein the display, the processor and the first communication interface are included in a housing; and
 a wireless telephone handset coupled to the first communication interface to be used for voice over Internet protocol (VoIP) calls, wherein the wireless telephone handset is adapted to fit in a slot in a keyboard tray coupled to a stand, the stand is to support the housing in a substantially upright position.

8. The system of claim 7, wherein the first communication interface is to be used for short range wireless communication.

9. The system of claim 7, further comprising:
 a second communication interface coupled to the processor, wherein the second interface is to be used for wireless local area network (WLAN) communications and to support the VoIP calls.

10. The apparatus of claim 7, wherein the housing further includes a finger print sensor to be used for authentication.

11. The system of claim 7, further comprising:
 a keyboard coupled to the processor, the keyboard included in the keyboard tray.

12. The system of claim 8, wherein the short range wireless communication is based on Bluetooth communication protocol.

13. An apparatus, comprising:
 a housing including a display, a processor coupled to the display, a Bluetooth communication interface, and a wireless local area network (WLAN) communication interface;
 a handle coupled to the housing, the handle is to include an antenna to be used for wireless communication using the WLAN communication interface; and
 a keyboard tray coupled to the housing, the keyboard tray is to include a keyboard and is coupled to a stand, wherein the stand is foldable relative to the housing and is to support the housing in a generally upright position.

14. The apparatus of claim 13, wherein the housing further includes a speaker and one or more microphones oriented in generally same direction as the display.

15. The apparatus of claim 13, wherein the keyboard tray further includes a remote control to control execution of an application displayed on the display via the Bluetooth communication interface.

16. The apparatus of claim 13, wherein the keyboard tray further includes a telephone handset to communicate with the Bluetooth communication interface and to be used for voice over Internet protocol (VoIP) calls via the WLAN communication interface.

17. The apparatus of claim 14, wherein the housing further includes a video camera and a fingerprint sensor oriented in generally same direction as the display.

18. An apparatus, comprising:
 a frame to support a housing in an upright position;
 a tray partially enclosed by the frame and slide-able into or out of the frame, wherein the tray is to include a wireless keyboard;
 a wireless remote control adapted to rest on the tray to a first side of the wireless keyboard; and
 a wireless telephone handset adapted to rest on the tray to a second side of the wireless keyboard.

19. The apparatus of claim 18, wherein the wireless keyboard, the wireless remote control, and the wireless telephone handset are to operate using Bluetooth communication protocol.

20. The apparatus of claim 18, wherein the frame is attached to the housing and foldable from the housing to support the housing in the upright position.

* * * * *